US012762454B2

(12) United States Patent
Griffin et al.

(10) Patent No.: US 12,762,454 B2
(45) Date of Patent: Oct. 13, 2026

(54) MITIGATION OF QUBIT DECOHERENCE IN QUANTUM COMPUTING AND INFORMATION PROCESSING SYSTEMS

(71) Applicant: Red Hat, Inc., Raleigh, NC (US)

(72) Inventors: Leigh Griffin, Waterford (IE); Stephen Coady, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 1033 days.

(21) Appl. No.: 17/853,048

(22) Filed: Jun. 29, 2022

(65) Prior Publication Data

US 2024/0005195 A1 Jan. 4, 2024

(51) Int. Cl.
*G06N 10/70* (2022.01)
*G06N 10/80* (2022.01)

(52) U.S. Cl.
CPC ............. *G06N 10/70* (2022.01); *G06N 10/80* (2022.01)

(58) Field of Classification Search
None
See application file for complete search history.

(56) References Cited

U.S. PATENT DOCUMENTS 6,873,154 B2 3/2005 Mor et al.
9,940,212 B2 * 4/2018 Kelly .................. G06F 11/2247
10,635,990 B1 * 4/2020 Park ..................... G11C 27/024
10,800,654 B2 10/2020 Leipold et al.
10,997,520 B2 5/2021 von Salis et al.
11,295,227 B2 * 4/2022 Coady ..................... G06F 8/311
11,372,676 B2 * 6/2022 Griffin ................... G06N 10/40
11,526,796 B2 * 12/2022 Lauer ................... H03K 19/195
11,880,744 B2 * 1/2024 Carroll ................... H10D 64/27
(Continued)

OTHER PUBLICATIONS

Sultanov et al., Protocol for Temperature Sensing Using a Three-Level Transmon Circuit, QTF Centre of Excellence, Department of Applied Physics, School of Science, Aalto University, FI-00076 Aalto, Finland; Dukhov Research Institute of Automatics (VNIIA), Moscow 127055, Russia; and Moscow Institute of Physics and Technology, 141700, Institutskii Per. 9, Dolgoprudny, Moscow Distr., Russia, Oct. 11, 2021.
(Continued)

*Primary Examiner* — Maikhanh Nguyen
(74) *Attorney, Agent, or Firm* — Dority & Manning, P.A.

(57) ABSTRACT

The ability to employ a qubit for computation and/or information processing is fragile. A qubit is employable for calculation purposes only when the qubit is in "coherence" with other qubits of the quantum computation system and isolated from other elements of the universe. Temperatures near absolute zero are often required for such isolation. Heat, as well as other conditions may cause a qubit to become decohered and "entangled" with other elements of the universe. The invention mitigates adverse issues associated with qubit decoherence in quantum computing and information processing systems. During the execution of a quantum computation, the utilized qubits are monitored for signatures indicating qubit decoherence and/or likely decoherence. Rising heat and/or temperature of a qubit may be one signal of decoherence. During the calculation, when a qubit is determined to be anomalous, the invention "swaps-out" the anomalous qubit and "swaps-in" a non-anomalous qubit.

16 Claims, 11 Drawing Sheets

(56) References Cited

U.S. PATENT DOCUMENTS

| | | | | |
|---|---|---|---|---|
| 12,197,945 | B2 * | 1/2025 | Fitzpatrick | G06N 10/60 |
| 12,346,775 | B2 * | 7/2025 | Griffin | H04L 67/1017 |
| 12,450,407 | B2 * | 10/2025 | Nosanow | G06N 10/00 |
| 2019/0392352 | A1 * | 12/2019 | Lampert | G06F 1/20 |
| 2020/0125983 | A1 * | 4/2020 | Hertzberg | G06F 13/4068 |
| 2020/0202248 | A1 * | 6/2020 | Mezzacapo | H03H 7/18 |
| 2020/0394544 | A1 | 12/2020 | Low et al. | |
| 2021/0152189 | A1 * | 5/2021 | Murali | G06N 10/20 |
| 2021/0232961 | A1 * | 7/2021 | Higa | H04L 41/0823 |
| 2022/0051121 | A1 * | 2/2022 | Griffin | G06N 10/20 |
| 2023/0196177 | A1 * | 6/2023 | Griffin | G06N 10/80 706/62 |

OTHER PUBLICATIONS

Demski et al., Quantum Information and Accounting Information: A Revolutionary Trend and the Role of Topology, Tepper School of Business, Carnegie Mellon University; Aug. 26, 2006.

Campisi, Michele, et al., "Feedback-controlled heat transport in quantum devices: theory and solid-state experimental proposal", New Journal of Physics, 19 (2017) 053027, Institute of Physics and Deutsche Physikalische Gesellschaft, published May 26, 2017, 13 pages.

* cited by examiner

MITIGATION OF QUBIT DECOHERENCE IN QUANTUM COMPUTING AND INFORMATION PROCESSING SYSTEMS

BACKGROUND

Quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit.

SUMMARY

The examples disclosed herein are directed towards mitigating qubit decoherence in quantum computing and information processing systems. In one non-liming embodiment, a method for mitigating anomalies associated with qubit decoherence includes receiving, by a computing device, an indication of a detected anomaly associated with a first set of qubits. The first set of qubits may be currently allocated for a quantum computation process. In response to receiving the indication, the computing device may cause an allocation of a second set of qubits for the quantum computation process.

The method may further include the computing device receiving the indication of the detected anomaly associated with the first set of qubits. The indication may encode that the anomaly is associated with a detection of an elevated temperature corresponding to at least one qubit of the first set of qubits. In other embodiments, the indication may encode that the anomaly is associated with a detected error or a detected error rate corresponding to at least one qubit of the first set of qubits.

In some embodiments, the indication of the detected anomaly is a first indication, and the anomaly is a first anomaly associated with the first set of qubits. The computing device may receive a second indication. The second indication may indicate a detected second anomaly associated with the first set of qubits. The second indication may be received subsequent to the first indication. The second anomaly may be a more severe anomaly than the first anomaly. In response to receiving the second indication, the computing device may cause a preparation of quantum states of the second set of qubits to be equivalent to quantum states of the first set of qubits.

In some embodiments, the first indication may encode a first temperature corresponding to at least one qubit of the first set of qubits. The first temperature may be greater than a first temperature threshold. The second indication may encode a second temperature corresponding to the at least one qubit of the first set of qubits. The second temperature may be greater than the first temperature, and the second temperature threshold may be greater than the first temperature threshold.

In other embodiments, the first indication may encode a first error rate corresponding to at least one qubit of the first set of qubits. The first error rate may be greater than a first error rate threshold. The second indication may encode a second error rate corresponding to the at least one qubit of the first set of qubits. The second error rate may exceed the first error rate. The second error rate threshold may exceed the first temperature threshold.

In some embodiments, the method may include the computing device causing a preparation of quantum states of the second set of qubits to be equivalent to quantum states of the first set of qubits. The quantum computation process may be updated to replace a utilization of the first set of qubits with a utilization of the second set of qubits. The computing device may cause a deallocation of the first set of qubits for the quantum computation process. The preparation of the quantum states of the second set of qubits may include a quantum swap gate performing a qubit swap operation between the first set of qubits and the second set of qubits.

In some embodiments, the first set of qubits is associated with a first quantum computing system (QCS) and the second set of qubits may be associated with a second QCS that is remote from the first QCS. In such embodiments, the method may further include selecting the second QCS from a set of QCSs. Selecting the second QCS may be based on a qubit monitor service that monitors a current utilization of each QCS in the set of QCS. The preparation of the quantum states of the second set of qubits may further include performing a quantum teleportation of the quantum states of the first set of qubits to the second set of qubits.

In some embodiments, the first QCS implements an execution of the quantum computation process. The computing device may cause a migration of the execution of the quantum computation process, from the first QCS to the second QCS. The migration of the execution of the quantum process may include the computing device causing the first QCS to suspend the execution of the quantum computing process at a particular step of the execution. The quantum computation process may be updated to replace a utilization of the first set of qubits with a utilization of the second set of qubits. The computing device may cause the second QCS to resume the execution of the quantum computing process at the particular step of the execution. When resumed, the updated quantum computing process may be implemented by the second QCS and utilize the second set of qubits In other embodiments the migration of the execution of the quantum process may include the computing device causing the first QCS to terminate the execution of the quantum computing process. The computing device may cause the second QCS to initiate a second execution of the quantum computing process from an initial step of the quantum computing process. When initiated, the second execution of the quantum computing process may utilize the second set of qubits.

In some embodiments, the method includes the computing device causing a qubit registry to indicate the allocation of the second set of qubits for the quantum computing process. The computing device may cause a deallocation of the first set of qubits for the quantum computation process. The computing device may cause a qubit registry to indicate the deallocation of the first set of qubits for the quantum computing process. The computing device may cause the qubit registry to indicate the detected anomaly associated with the first set of qubits. The second set of qubits may be selected from a superset of qubits based on a state of a qubit registry that indicates a current allocation status for each qubit of the superset of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
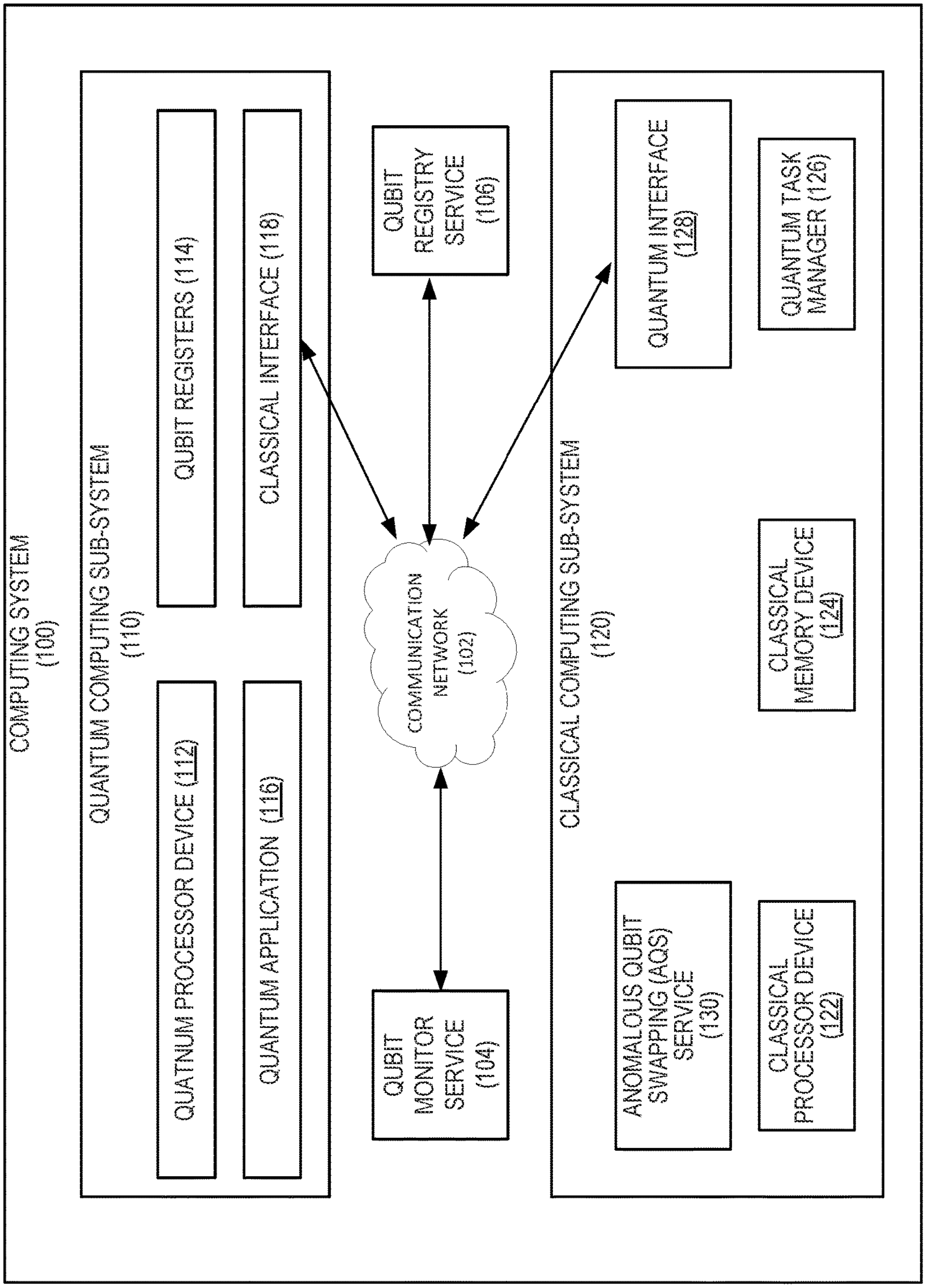
FIG. 1A is a block diagram of a computing system in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first quantum computing device” and “second quantum computing device,” and does not imply a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word “or” as used herein and in the claims is inclusive unless contextually impossible. As an example, the recitation of A or B means A, or B, or both A and B.

Quantum computing involves the use of quantum bits, referred to herein as “qubits,” each of which has properties (such as superposition and entanglement) that differ from those of classical (i.e., non-quantum) bits used in classical computing. Qubits may be employed by quantum services that are executed by quantum computing systems that include one or more quantum computing devices. Quantum computing devices also execute quantum core services (QCSs), which are operating-system-level services that provide functionality for managing and facilitating the use of qubits and the execution of quantum services. These QCSs may include, as non-limiting examples, a qubit registry, a quantum task manager, a quantum process scheduler, a qubit monitor, and/or an anomalous qubit swapping service, examples of which are discussed in greater detail below.

As discussed below, the ability to employ a qubit for computation and/or information processing is fragile. More particularly, a qubit may be employable for calculation purposes only when the qubit is in “coherence” with other qubits of the quantum computation system and isolated from other elements of the universe. Temperatures near absolute zero are often required for such isolation. Heat, as well as other conditions may cause a qubit to become decohered and “entangled” with other elements of the universe. The embodiments are directed towards mitigating adverse-issues associated with qubit decoherence in quantum computing and information processing systems. During the execution of a quantum computation, the embodiments monitor the utilized qubits for signatures indicating qubit decoherence and/or likely decoherence. Rising heat and/or temperature of a qubit may be one signal of decoherence, or a decoherence likely in the near future. During the quantum calculation (and in real time), when a qubit is determined to be anomalous (e.g., decohered or likely to become decohered), the embodiments “swap-out” the anomalous qubit and “swaps-in” a non-anomalous qubit.

The various embodiments are directed towards an anomalous qubit swapping (AQS) service. Within the context of a QCS, the ACS service may mitigate any degradations in the performance of the QCS that are associated with qubit decoherence. More particularly, during a quantum computation, the AQS may “swap” out qubits that have become decohered, or are likely to become decohered, for coherent qubits.

A qubit that has lost its coherence or is likely to lose its coherence during the computation may be referred to as an “anomalous” qubit. A “non-anomalous” (or “healthy”) qubit may be a qubit that is enabled to be prepared in a coherent state and is likely to conserve its coherence throughout the execution of the computation. As discussed below, coherent qubits may quantum-mechanically encode “rich” information, while decoherent qubits are enabled to encode only binary information. Stated another way, coherent qubits are useful for quantum computation and information processing, while decoherent qubits may be only “trivially” useful for quantum computation. Accordingly, non-anomalous qubits are qubits that are likely useful in a quantum computation, while anomalous qubits are qubits that are not useful in the computation, or likely to become not useful during the computation. During a computation, the AQS service may swap out anomalous qubits (e.g., non-useful or are likely to become non-useful) for non-anomalous (e.g., useful) qubits. In this way, the AQS service may mitigate any degradation in the performance of the QCS that is attributable to qubit decoherence.

To mitigate issues associated with qubit decoherence, the AQS may employ a qubit monitoring service. The qubit monitoring service may provide the AQS service with signals indicating various aspects reflecting the “usability” of the qubits for a quantum computing task and/or a quantum information processing task by a quantum computing system (QCS). Any such quantum computing task or quantum information processing task may be generally referred to as a quantum computation process (QCP). The usability of a qubit in the performance of QCP may be analogized to a “health” of the qubit. Thus, the signals generated by the qubit monitoring service may be referred to as “qubit health signals” (QHSs). Briefly, the “health” of a qubit may reflect on whether or not the qubit is currently a “coherent” qubit and/or whether the qubit is likely to become decohered at some point during a QCP utilizing the qubit.

The AQS service may be a real-time qubit-swapping service, in that, during an ongoing QCP, the AQS service analyzes (in real-time) the qubit health signals from the qubit monitoring service. If the signals indicate that one or more currently allocated qubits are experiencing (or likely to experience during the performance of the QCP) an anomaly with respect to the qubit's health, the AQS service may make other "healthy" (or non-anomalous) qubits available for the performance of the QCP. In various embodiments, the AQS service may "swap out" the anomalous qubits. The computational (or information processing) "role" of the anomalous qubits (for the QCP) may be assumed by the non-anomalous (or healthy) qubits. In this way, the AQS service mitigates, or at least decreases the likelihood for, failures or errors in a QCP by "swapping" non-anomalous qubits for anomalous during the performance of a QCP.

The AQS service may employ a qubit registry (or qubit registry service) to mitigate issues associated with qubit decoherence. More particularly, the qubit registry may track which qubits of the QCS are currently allocated to one or more QCPs, and which qubits are currently available for computational purposes (e.g., which of the QCS' qubits are currently not allocated to a QCP). The qubits that are tracked by the qubit registry service may distributed across one or more QCSs. Accordingly, the currently available qubits may be qubits of the QCS implementing the QCP, or may be qubits included in another accessible QCS. In at least one embodiment, the qubit registry service may also track which of the available qubits are anomalous qubits, and which qubits are non-anomalous. The AQS service may employ the information tracked by the qubit registry to locate and select which non-anomalous (and currently deallocated) qubits to "swap in" and replace the computational role of the anomalous qubits.

As discussed below, the concept of coherence is central to quantum computation and quantum information processing. As discussed in greater detail below, for a qubit to be of utility in quantum computation and information processing, the qubit must be in coherence with itself and other qubits of the QCS. For a qubit to be of utility (and thus for the qubit to be a "healthy" qubit) in a computation, the qubit must be able to sustain (at least for the duration of the computation) a superposition of two eigenstates (e.g., eigenstates associated with a "measurement" or "read" operation of the QCS). When a qubit is not in a superposition of states, but in definite eigenstate of the read operation, the qubit may be in a "pure state." In addition to sufficiently sustaining a state of superposition, a non-anomalous (or healthy) qubit must be able to be quantum-mechanically "entangled" with other qubits of the QCS.

The concept of qubit coherence is critical to the qubit's ability to sustain a state of superposition and entanglement with other qubits. For a qubit to be in coherence with itself and other qubits of the QCS, the qubit must be able to be coupled to other qubits of the QCS, but isolated from the rest of the universe (e.g., the environment). When a qubit becomes entangled (e.g., non-isolated) with elements of the universe other than other qubits of the QCS, the qubit is said to be decohered with respect to the QCS, and it is of limited use for computational purposes. Given the "fragility" of quantum states, it is inherently difficult to isolate individual qubits from the rest of the universe. For example, qubit isolation may require cooling the qubits to temperatures relatively close to absolute zero. Thus, sources of heat within the QCS and the environment may be a significant threat to a qubit's overall health, with respect to computational purposes.

As noted above, quantum computation and quantum information processing exploit a qubit's ability to sustain a superposition of (e.g., including a relative phase difference between) two eigenstates associated with the read operation of the QCS. A qubit quantum-mechanically encodes information via a superposition of two eigenstates (or basis states) of a "read" or "measurement" apparatus, as well as a relative phase difference between the two eigenstates. When a state of a qubit is measured or observed (e.g., via a read or measurement operation), the qubit may become entangled with the measurement apparatus, and the qubit has become decohered. The information associated with the superposition and relative phase is permanently lost in the operation of "reading" or "measuring" the qubit. To be re-used in the computation, the QCS must re-establish the qubit's coherence via one or more operations.

In contrast to classical bits, which by definition encode only a single bit of information, a single qubit via its superposition may, in some sense, encode an infinite amount of information. When a "read" operation is performed on a qubit in superposition, the qubit's wavefunction (e.g., which corresponds to the qubit's state of superposition) stochastically "collapses" to one of the two possible eigenstates. When a qubit's wavefunction collapses, the infinite amount of information corresponding to the qubit's wavefunction collapses to a single bit of information corresponding to the eigenstate corresponding to the collapse. Although the infinite amount of information encoded by a qubit may not be readily extracted by a QCS, the information may be "distributed" to other qubits and utilized in a computation via the entanglement process. Via operations such as but not limited to entanglement, amplitude amplification, and quantum Fourier transforms, information quantum mechanically encoded in a qubit may be extracted via indirect means.

To utilize the infinite amount of information stored in a qubit, quantum computation and quantum information processing also exploits "entanglement" of two or more qubits. Two qubits may be said to be entangled when their quantum states are correlated. Via the quantum-mechanical process of entanglement (e.g., quantum-mechanically correlated), a qubit may share and/or distribute its information (e.g., as encoded in its state of superposition) with one or more other qubits. Via entanglement of qubits, the "richness" of a "computational space" provided by a system of qubits grows exponentially as the number of qubits increases in the system. For instance, the space of quantum states describing a system of n qubits is generated via a tensor product of the n qubits, rather than a direct product of the n qubits.

A QCS may be enabled to selectively prepare individual qubits in specific states of superposition, and selectively entangle combinations of qubits in specific states of entanglement. It is the ability of a qubit to store a large amount of information (via superposition) and the "rich" and "deep" computational space (via an entanglement that distributes information across combinations of qubits) that renders some types of classically intractable computations tractable by a QCS.

As noted above, in quantum computation and information processing, the concept of "coherence" is critical for a qubit's ability to encode quantum information useful in the computation. More specifically, the property of coherence refers to a qubit's ability to retain (over a period of time sustaining the computation) a phase difference between two orthogonal eigenstates of the qubit. As noted above, for a qubit to quantum-mechanically encode information (and thus be useful in a QCP), the qubit must be enabled to remain in a state of superposition throughout the computation. That is, for a qubit to be in a superposition of eigenstates (and thus be of utility in a computation), the qubit must be a coherent qubit. For a qubit to retain its coherence, the qubit must be isolated from its environment. Once a qubit's wavefunction becomes "entangled" with the wavefunction of its environment, the qubit is said to be a decohered qubit. In some sense, when an information-carrying coherent qubit becomes decohered, the encoded information is permanently “lost” to the qubit’s environment via its entanglement with the environment.

Accordingly, the ACS service monitors (in real-time and during a QCP) the qubit health signals (e.g., provided by a qubit monitoring service) for signatures indicating a likelihood of qubit decoherence, or a likelihood of an impending qubit decoherence event. When the ACS service determines that a qubit has likely become decohered, or is likely to become decohered in the near future of the computation, the ACS service may label the qubit as an anomalous (or “unhealthy”) qubit. When a qubit is labeled as anomalous (or likely anomalous), the ACS service may make other non-anomalous (or otherwise healthy) qubits available to the QCS. In at least one embodiment, the anomalous qubits are “swapped” out of the computation, and the role of the “swapped-out” qubits are replaced by non-anomalous qubits in the computation. The AQS service may employ a qubit registry to select currently available and non-anomalous qubits to “swap into” the computation.

Increasing temperature (or other signatures of heat) provide one signature for qubit decoherence, or likely future decoherence. Thus, in some embodiments, the ACS service monitors the temperature of qubits as a signature for qubit health and/or coherence, via the qubit health signals. A qubit may be deemed as anomalous (or likely to become anomalous) if a temperature of the qubit (or the immediate physical surroundings of the qubit) is greater than a temperature threshold. In such embodiments, the temperature of a qubit may be employed as a proxy for the utility of the qubit in computations.

In other embodiments, the occurrence of one or more errors associated with a qubit may be employed as a proxy for the qubit’s utility in computations. In such embodiments, the ACS service may analyze the qubit health signals for occurrences of computational errors associated with the qubits. If an error rate associated with a qubit becomes greater than an error-rate threshold, the AQS service may label the qubit may as anomalous. In the embodiments, signatures other than temperature and error rates may be employed as proxy signals for the health of a qubit. In some embodiments, a combination of a plurality of signatures (e.g., a combination of temperature and error rates) may be employed as a proxy signal for the qubit’s health.

In various embodiments, the ACS service may provide qubit swap services via a plurality of escalating stages of deteriorating qubit health. Some embodiments may implement at least two stages of declining qubit health. For example, the AQS service may monitor the temperature of qubits and employ two temperature thresholds: a first temperature threshold and a second temperature threshold that is greater than the first temperature threshold. When a first qubit’s temperature exceeds the first temperature threshold, the ACS service may cause a second (non-anomalous) qubit to be allocated to the QCP. Exceeding the first temperature threshold may be a sign that the first qubit’s health (or utility) is declining. The second qubit may be a “backup” qubit, in the case that the first qubit’s health continues to decline. The second qubit may be identified or selected, via a qubit registry service.

If (and when) the first qubit’s health exceeds the second temperature threshold, the first qubit’s role in the computation may be swapped over to the second (or backup) qubit. That is, upon exceeding the second temperature threshold, the first and second qubits may be swapped in the computation. More particularly, the first qubit may be swapped-out of the computation and the second qubit may be swapped-in to the computation and assume the role of the swapped-out first qubit. In some embodiments, the first qubit may be deallocated from the computation. Other embodiments may include more than two stages of escalating deterioration in the health of a qubit. In at least one embodiment, the AQS service may employ a single stage of monitoring. In such embodiments, the AQS service may swap out the first qubit, and replace it in the computation, with the second qubit, when the AQS initially detects that the first qubit has exceeded the first temperature threshold. Escalating stages of deteriorating qubit health may be employed for other signatures of qubit anomalies, e.g., escalating error-rate thresholds and the like.

In some embodiments, swapping out a qubit may include swapping the quantum states of the first and second qubits. That is, prior to being “swapped-in” to the computation, the second (non-anomalous) qubit may be prepared in a quantum state that is equivalent to (or at least similar to) the quantum state of the first (anomalous) qubit. The no-cloning theorem of quantum mechanics dictates that a qubit “copy” operation is not possible in quantum computations. However, such swapping of the quantum states may be performed via qubit swap gates or quantum teleportation protocols. Also note that the quantum state of the first qubit need not be known to perform such qubit swap or quantum teleportation operations.

In such “quantum-state swapping” embodiments, the quantum computations may be temporarily “suspended” or paused. Upon pausing the computations, the quantum states of the first and second qubits are then swapped (or the state of the first qubit is teleported to the second qubit). The quantum computation may then be resumed after the swapping or teleportation of the states. The instruction set of the quantum computation may be updated to reflect that fact that the role of the first qubit has been taken over by the second qubit. The quantum computation may be resumed on the same QCS, or on another QCS that is remote from the QCS that initialized the computation. That is, the quantum computation may be migrated to another QCS. The second qubit may be a qubit of the initial QCS, or the other QCS. In other embodiments, the quantum computation may be reinitialized and/or re-started to employ the second qubit, rather than the first qubit. The computation may be reinitialized or restarted on the same QCS, or on a separate (or remote) QCS.

In other embodiments, the computation need not be paused to perform the qubit swapping operation. That is, the qubit swap may be a “hot-swap” that occurs during the execution of the computation. For example, the “instruction set” (or quantum logic gates) of the computation may be updated to include the qubit the qubit swap or teleportation as part of the computation. In still other embodiments, the operation of swapping in the second qubit may include terminating the computation. In such embodiments, the computation (e.g., employing the second qubit) may be re-initialized and/or re-started from the beginning of the computation on the same QCS or another QCS.

FIG. 1A is a block diagram of a computing system 100 in which examples may be practiced. Computing system 100 is enabled to implement anomalous qubit swapping services. Within the context of a quantum computations and information processing, the anomalous qubit swapping services may mitigate any degradations in the performance of the computations/information processing that are associated with qubit decoherence. More particularly, during a quantum computation, the anomalous qubit swapping services may "swap" out qubits that have become decohered, or are likely to become decohered, for coherent qubits.

Computing system 100 may be comprised of a set of subsystems. In the non-limiting embodiment of FIG. 1A, computing system 100 includes a quantum computing sub-system 110 and classical computing sub-system 120. Each of quantum computing sub-system 110 and classical computing sub-system 120 may be considered to be complete systems of themselves. Computing system 100 may further include a qubit monitor service 104 and a qubit registry system 106. Computing system 110 may additionally include a communication network 102 that communicatively couples quantum computing sub-system 110, classical computing sub-system 120, qubit monitor service 104, and qubit registry service 106.

Quantum computing sub-system 110 is generally responsible for carrying out computation and information processing, in a quantum context. More specifically, quantum computing sub-system 110 employs qubits as the fundamental unit of information to carry-out various computations and information processing tasks. Classical computing sub-system 120 is generally responsible for carrying out computation and information processing, in a classical context. More specifically, classical computing sub-system 120 employs binary bits as the fundamental unit of information to carry-out various computations and information processing tasks. Qubit monitor service 104 is generally responsible for monitoring the "health" (e.g., as related to the coherence) of the qubits employed by the quantum computing sub-system 110. Qubit registry service 106 is generally responsible for tracking the allocation and use of the qubits by the quantum computing sub-system 110.

To carry out its quantum computations and quantum information processing functionalities, quantum computing sub-system 110 may include various components and/or elements. In the non-limiting embodiments of FIG. 1A, quantum computing sub-system 110 includes a quantum processing device 112, a quantum application 116, a classical interface 118, and a set of qubit registers 114. Details of the functionality and responsibilities of the various components are discussed in conjunction with at least FIG. 1B. However, briefly here, the quantum application 116 may include a set of instructions and/or a sequential list of quantum logic gates that implement a quantum computation. The quantum processing device 112 may include means to interpret the set of instructions, as well as implement the set of instructions and/or the sequential list of quantum logic gates. The quantum processing device 112 may include a set of quantum logic gates. The qubit registers 114 may include a set of qubits arranged into a set of qubit registers. The classical interface 118 may be an interface that enables the quantum computing sub-system 110 to communicate with the classical computing sub-system 120, as well as the qubit monitor service 104 and the qubit registry service 106.

To carry out its classical computations and classical information processing functionalities, classical computing sub-system 120 may include various components and/or elements. In the non-limiting embodiments of FIG. 1A, classical computing sub-system 120 includes a classical processor device 122 and a classical memory device 124. Classical computing sub-system 120 may additionally include an anomalous qubit swapping (AQS) service 130, a quantum task manager 126, and a quantum interface 128. Details of the functionality and responsibilities of the various components are discussed in conjunction with at least FIG. 1B. However, briefly here, classical processor device 122 may be central processing unit (CPU), a graphical processing unit (GPU), or another such device enabled to carry out machine instructions. The classical memory device 124 may be any device enabled to read, write, and access a set of classical bits implemented by the classical memory device 124. The quantum task manager 126 is generally responsible for scheduling and/or managing various quantum computation tasks implemented by the quantum computing sub-system 110. The quantum interface 128 may be an interface that enables the classical computing sub-system 120 to communicate with the quantum computing sub-system 110, as well as the qubit monitor service 104 and the qubit registry service 106. For instance, the quantum interface 128 and the classical interface 118 may be enabled to "talk" to one another, and translate information provided from the other sub-system, into a format that is consistent with its native data schemas.

The AQS service 130 is generally responsible for swapping out anomalous qubits (e.g., non-useful qubits or qubits that are likely to become non-useful) for non-anomalous (e.g., useful) qubits, during a quantum computation. In this way, the AQS service 130 may mitigate any degradation in the performance of the computing system 100 that is attributable to qubit decoherence. A qubit that has lost its coherence or is likely to lose its coherence during the computation may be referred to as an "anomalous" qubit. A "non-anomalous" (or "healthy") qubit may be a qubit that is enabled to be prepared in a coherent state and is likely to conserve its coherence throughout the execution of the computation. As discussed below, coherent qubits may quantum-mechanically encode "rich" information, while decoherent qubits are enabled to encode only binary information. Stated another way, coherent qubits are useful for quantum computation and information processing, while decoherent qubits may be only "trivially" useful for quantum computation. Accordingly, non-anomalous qubits are qubits that are likely useful in a quantum computation, while anomalous qubits are qubits that are not useful in the computation, or likely to become not useful during the computation.

To mitigate issues associated with qubit decoherence, the AQS service 130 may employ the qubit monitoring service 104. The qubit monitoring service 104 may provide the AQS service 130 with signals indicating various aspects reflecting the "usability" of the qubits for a quantum computing task and/or a quantum information processing task by the quantum computing sub-system 110. Any such quantum computing task or quantum information processing task may be generally referred to as a quantum computation process (QCP). More generally, a QCP may be any computation and/or information processing task implemented by the quantum computing sub-system 110. The usability of a qubit in the performance of QCP may be analogized to a "health" of the qubit. Thus, the signals generated by the qubit monitoring service 104 may be referred to as "qubit health signals" (QHSs). Briefly, the "health" of a qubit may reflect on whether or not the qubit is currently a "coherent" qubit and/or whether the qubit is likely to become decohered at some point during a QCP utilizing the qubit.

The AQS service 130 may be a real-time qubit-swapping service, in that, during an ongoing QCP, the AQS service 130 analyzes (in real-time) the qubit health signals from the qubit monitoring service 104. If the signals indicate that one or more currently allocated qubits are experiencing (or likely to experience during the performance of the QCP) an anomaly with respect to the qubit's health, the AQS service 130 may make other "healthy" (or non-anomalous) qubits available for the performance of the QCP. In various embodiments, the AQS service 130 may "swap out" the anomalous qubits. The computational (or information processing) "role" of the anomalous qubits (for the QCP) may be assumed by the non-anomalous (or healthy) qubits. In this way, the AQS service 130 mitigates, or at least decreases the likelihood for, failures or errors in a QCP by "swapping" non-anomalous qubits for anomalous during the performance of a QCP.

The AQS service 130 may employ the qubit registry service 106 to mitigate issues associated with qubit decoherence. More particularly, the qubit registry service 106 may track which qubits of the qubit registers 114 are currently allocated to one or more QCPs, and which qubits are currently available for computational purposes (e.g., which of the qubits of the qubit registers 114 are currently not allocated to a QCP of the quantum computing sub-system 110). The qubits that are tracked by the qubit registry service 106 may distributed across one or more computing systems. Accordingly, the currently available qubits may be qubits of the qubit registers 114, or may be qubits included in another accessible quantum computing system. In at least one embodiment, the qubit registry service 114 may also track which of the available qubits are anomalous qubits, and which qubits are non-anomalous. The AQS service 130 may employ the information tracked by the qubit registry 114 to locate and select which non-anomalous (and currently deallocated) qubits to "swap in" and replace the computational role of the anomalous qubits.

Figure 1B:
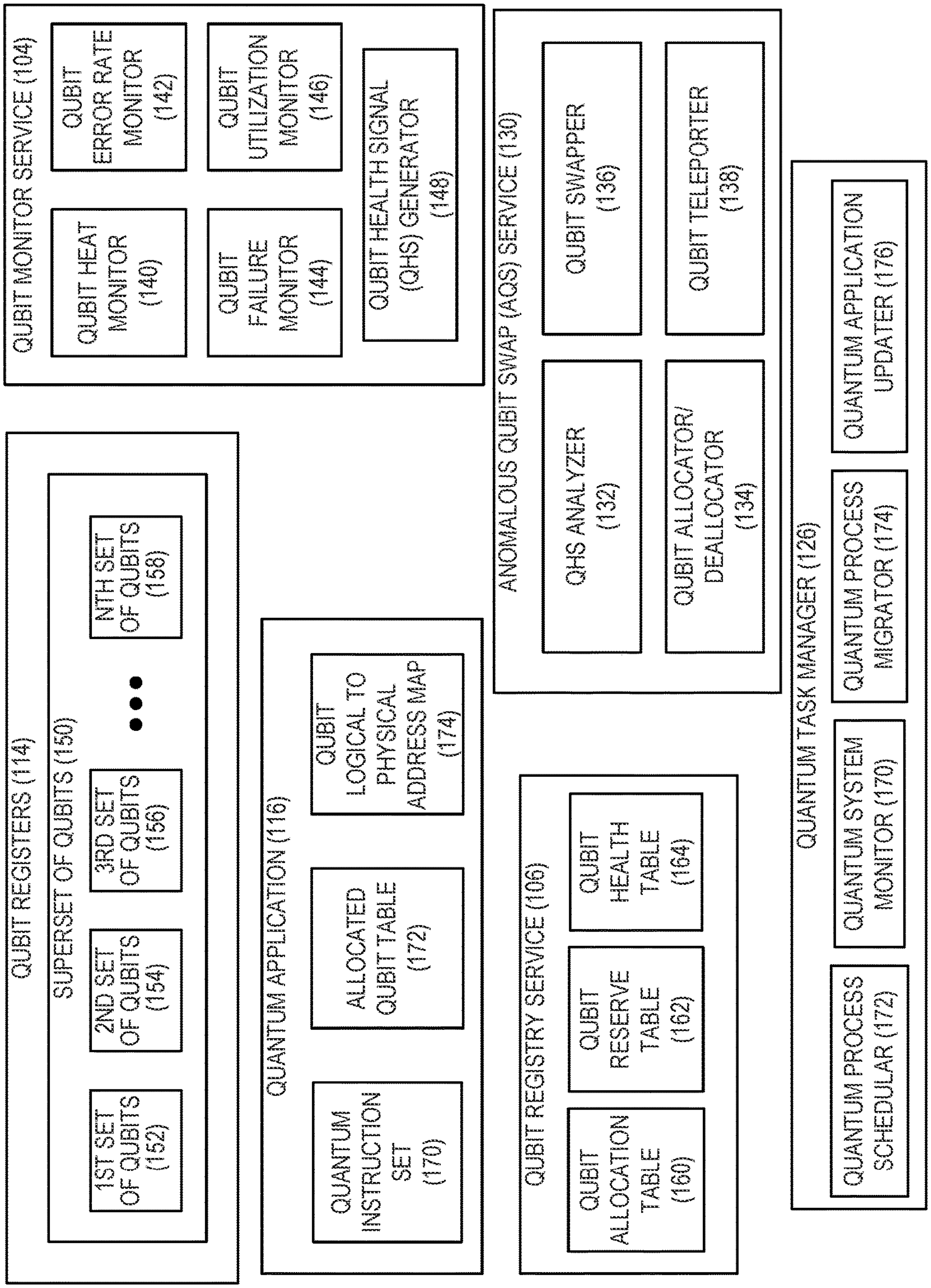
FIG. 1B is a block diagram of various components of the computing system of FIG. 1A.

FIG. 1B is a block diagram of various components of the computing system 100 of FIG. 1A. With regards to the quantum computing sub-system 110 of FIG. 1A, example components of the qubit registers 114 and the quantum application 116 are shown in FIG. 1B. With regards to the classical computing sub-system 120 of FIG. 1A, example components of the anomalous qubit swap (AQS) service 130 and the quantum task manager 126 are shown in FIG. 1B. Additionally, example components of the qubit monitor service 104 and the qubit registry service 106 are shown in FIG. 1B. It is noted that the components of the various elements of computing system 100 shown in FIG. 1B are for illustrative purposes only. The components of the computing system 100 may vary in other embodiments.

The qubit registers 114 of quantum computing sub-system 110 may include a superset of qubits 150. The superset of qubits 150 may be a set of sets of qubits. For instance, the superset of qubits 150 may include n sets of qubits, where n is a positive integer, e.g., a first set of qubits 152, a second set of qubits 154, a third set of qubits 156, . . . , and an nth set of qubits 158. Each set of qubits may include a qubit register of the qubit registers 114.

In a non-limiting embodiment, the quantum application 116 may include a quantum instruction set 170, an allocated qubit table 172, and a qubit logical to physical address map 174. In other embodiments, the quantum application 116 may include additional and/or alternative elements. The quantum instruction set 170 may include a description of acyclic quantum circuits, where a quantum circuit includes one or more quantum gates. In non-limiting embodiments, the quantum instruction set 170 may be formatted in the QASM language, or other similar quantum programming languages. The quantum instruction set 170 may be referred to as the "source code" for a quantum computation process (QCP) corresponding to the quantum application 116. The allocated qubit table 172 may include a table of the addresses of qubits (e.g., of the superset of qubits 150) currently allocated to an implementation of the quantum application 116 currently being implemented by the quantum computing sub-system 110. The qubit logical to physical address map 174 may include a mapping between the physical and logical addresses of the qubits listed in the allocated qubit table 172.

The qubit registry service 106 may track the allocation and health status of each of the qubits of the qubit registers 114. To carry out these and other functions, the qubit registry service 106 may include a qubit allocation table 160, a qubit reserve table 162, and a qubit health table 164. The qubit allocation table 160 may include a table that lists each of the qubits of the quantum registers 114 that are allocated to the quantum application 116, as well as any other applications that are currently implemented by the quantum computing sub-system 110. The qubit reserve table 162 may include a table that lists qubits that are held in reserve (e.g., being allocated) for quantum application 116, as well as any other applications that are currently implemented by the quantum computing sub-system 110. For instance, the AQS service 130 may have allocated "reserve" qubits for the quantum application 116 because the AQS service 130 has determined that one or more of the qubits currently being utilized by quantum application 116 has a likelihood of become decohered during the execution of quantum application 116. The qubit health table 164 may include a table that lists a health status (e.g., anomalous or non-anomalous) of each of the qubits included in the qubit registers 114. The AQS service 130 may determine the health status of each of the qubits. In other embodiments, the qubit monitor service 104 may determine the health status of each of the qubits.

The qubit monitor service 104 may monitor (in real time) at least each of the qubits currently allocated to the quantum application 116, as well as any other application being implemented by the quantum-computing sub-system 110. In at least one embodiment, the qubit monitor service 104 may monitor each of the qubits of the qubit registers 114. To carry out these and other functions, the qubit monitor service 104 may include a qubit heat monitor 140, a qubit error rate monitor 142, and a qubit failure monitor 144. The qubit monitor service 104 may additionally include a qubit utilization monitor 146 and a qubit health signal (QHS) generator 148.

The qubit heat monitor 140 may monitor the heat or temperature of the qubits. The qubit error rate monitor 142 may monitor errors and/or error rates of the qubits. The qubit failure monitor 144 may monitor failures of the qubits. Such failures may include those that are attributable to heat and errors, as whether other failure modes of the qubits. The qubit utilization monitor 146 may monitor the utilization and/or duty cycles of the qubits. The QHS generator 148 may generate qubit health signals based on the monitoring functionalities of the qubit heat monitor 140, the qubit error rate monitor 142, the qubit failure monitor 144, and/or the qubit utilization monitor 146. Such qubit health signals may be provided to the AQS service 130.

The AQS service 130 of the classical computing sub-system 120 may be a real-time qubit-swapping service. During an ongoing QCP, the AQS service 130 analyzes (in real-time) the qubit health signals generated by the QHS generator 148. If the health signals indicate that one or more currently allocated qubits are experiencing (or likely to experience during the performance of the QCP) an anomaly with respect to the qubit's health, the AQS service 130 may make other "healthy" (or non-anomalous) qubits available for the performance of the QCP. In various embodiments, the AQS service 130 may "swap out" the anomalous qubits. To carry out these and other functions, the AQS service 130 may include a QHS analyzer 132, a qubit allocator/deallocator 134, a qubit swapper 136, and a qubit teleporter 138.

The QHS analyzer 132 analyzes the qubit health signals. For each qubit currently being utilized in a QCP (e.g., a QCP implemented via quantum application 116 or another quantum application). For each qubit, the QHS analyzer 132 determines the health status (e.g., anomalous or non-anomalous) based on the qubit health signals. The qubit allocator/deallocator 134 is generally responsible for deallocating anomalous qubits and allocating non-anomalous qubits for the quantum application 116. The qubit swapper 136 is generally responsible for applying quantum swap gates to mirror the quantum states of anomalous qubits in the non-anomalous qubits that are to replace the anomalous qubits. The qubit swapper 136 may send instructions to the quantum computing sub-system 110 to apply the quantum swap gates. The qubit teleporter 138 may be employed in distributed environments to initiate a mirroring of the quantum states. For distributed environments, where the non-anomalous qubit that will replace the anomalous qubit are not physically co-located in a common region, the qubit teleporter 138 may initiate the quantum computing sub-system 110 to teleport the quantum states of anomalous qubits to non-anomalous qubits in a remote quantum computing system.

The quantum task manager 126 of the classical computing sub-system 120 is generally responsible for scheduling QCPs for the quantum computing sub-system 110, monitoring those QCPs, and migrating those QCPs to other quantum computing system when not enough non-anomalous qubits are available on the quantum computing sub-system 110. The quantum task manager 126 may also update the quantum application 116 to account for the replacing, swapping, or teleporting of the anomalous qubits. To carry out these and other functions, the quantum task manager 126 may include a quantum process schedular 172, a quantum system monitor 170, a quantum process migrator 174, and a quantum application updater 176. The quantum process schedular 172 is generally responsible for scheduling QCPs on the quantum computing sub-system 110. The quantum system monitor 170 may monitor those QCPs. The quantum process migrator 174 is generally responsible for initiating and managing the migration of a QCP to another quantum computing system. The quantum application updater 176 is generally responsible for updating the quantum application 116 when anomalous qubits are swapped out and/or replaced with non-anomalous qubits.

In real-time and during a QCP, the QHS analyzer 132 monitors the qubit health signals generated by the QHS generator 148. More specifically, the QHS analyzer 132 analyzes the qubit health signals to identify signatures indicating a likelihood of qubit decoherence, or a likelihood of an impending qubit decoherence event. When the QHS analyzer 132 determines that a qubit has likely become decohered, or is likely to become decohered in the near future of the computation, the QHS analyzer 132 may label the qubit as an anomalous (or "unhealthy") qubit. When a qubit is labeled as anomalous (or likely anomalous), the ACS service 130 may make other non-anomalous (or otherwise healthy) qubits available to the QCS. The ACS service 130 may instruct the qubit registry servicer 106 to update the qubit health table 164 to reflect determination that the qubit is now an anomalous qubit. The AQS service 130 may initiate the swapping out of the anomalous qubits. The AQS service 130 may initiate the replacing of the anomalous qubits with non-anomalous qubits in the QCP. The AQS service 130 may employ the qubit registry service 106 to select currently available and non-anomalous qubits to "swap into" the computation, via the information encoded in the qubit allocation table 160 and the qubit health table 164.

Increasing temperature (or other signatures of heat) provide one signature for qubit decoherence, or likely future decoherence. Thus, in some embodiments, the qubit heat monitor 140 monitors the temperature of qubits. The QHS generator 148 encodes the temperatures in qubit health signals, which are provided to the QHS analyzer 132. The QHS analyzer 132 interprets the encoded temperatures as a signature for qubit health and/or coherence. The QHS analyzer 132 may determine that a qubit is anomalous (or likely to become anomalous) if a temperature of the qubit (or the immediate physical surroundings of the qubit) is greater than a temperature threshold. In such embodiments, the QHS analyzer 132 may employ the temperature of a qubit as a proxy for the utility of the qubit in computations.

The qubit error rate monitor 142 may monitor the error rates in the qubits. The QHS generator 148 may encode the error rates in the qubit health signatures. The QHS analyzer ay employ the occurrence of one or more errors associated with a qubit as a proxy for the qubit's utility in computations. More particularly, the QHS analyzer 132 may analyze the qubit health signals for occurrences of computational errors associated with the qubits. If an error rate associated with a qubit becomes greater than an error-rate threshold, the QHS analyzer 132 may label the qubit may as anomalous. In the embodiments, signatures other than temperature and error rates may be employed as proxy signals for the health of a qubit. For instance, the qubit failure monitor 144 may monitor the qubits for general failures and the qubit utilization monitor 146 may monitor the utilization of the qubits. The general failures and utilization data may be employed as a signature for qubit health. In some embodiments, a combination of a plurality of signatures (e.g., a combination of temperature and error rates) may be employed as a proxy signal for the qubit's health.

In various embodiments, the QHS analyzer 132 may provide qubit swap services via a plurality of escalating stages of deteriorating qubit health. In some embodiments, the QHS analyzer 132 may implement at least two stages of declining qubit health. For example, the QHS analyzer 132 may monitor the temperature of qubits (via the analysis of the qubit health signals) and employ two temperature thresholds: a first temperature threshold and a second temperature threshold that is greater than the first temperature threshold. When a first qubit's temperature exceeds the first temperature threshold, the qubit allocator/deallocator 134 may cause a second (non-anomalous) qubit to be allocated to the QCP, as a reserved qubit. The qubit allocation table 160 and/or the qubit reserve table 162 may be updated to indicate the allocation and reserving of the second qubit for the QCP. Exceeding the first temperature threshold may be a sign that the first qubit's health (or utility) is declining. The second qubit may be a "backup" or reserve qubit, in the case that the first qubit's health continues to decline. The second qubit may be identified or selected, via a qubit registry service.

If (and when) the QHS analyzers 132 detects that the first qubit's health exceeds the second temperature threshold, the first qubit's role in the computation may be swapped over to the second (or backup) qubit. That is, upon exceeding the second temperature threshold, the first and second qubits may be swapped in the computation. More particularly, via at least one of the qubit swapper 136 or the qubit teleporter 138, the first qubit may be swapped-out of the computation and the second qubit may be swapped-in to the computation and assume the role of the swapped-out first qubit. In some embodiments, the qubit allocator/deallocator 134 may deallocate the first qubit may be deallocated from the computation. The AQS service 130 may instruct the qubit registry service 106 to update the qubit allocation table 160 and the qubit health table 164 to reflect the deallocation of the first qubit, as well as the detection of the first qubit to be an anomalous qubit. In other embodiments, the QHS analyzer 132 may implement more than two stages of escalating deterioration in the health of a qubit. In at least one embodiment, the QHS analyzer 132 may employ a single stage of monitoring. In such embodiments, the AQS service 130 may swap out the first qubit, and replace it in the computation, with the second qubit, when the AQS initially detects that the first qubit has exceeded the first temperature threshold. Escalating stages of deteriorating qubit health may be employed for other signatures of qubit anomalies, e.g., escalating error-rate thresholds and the like.

Figure 2A:
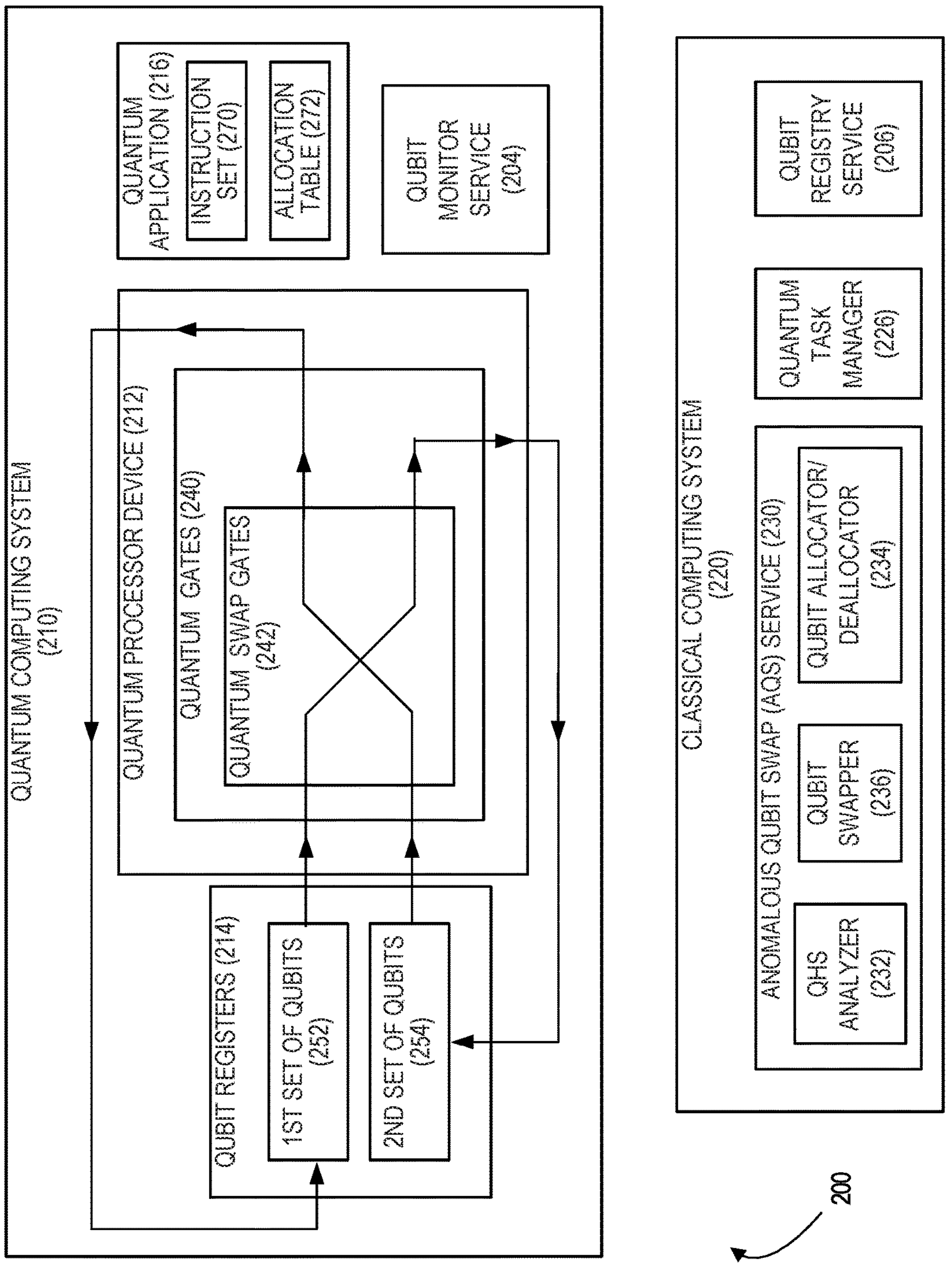
FIG. 2A is a block diagram of a computing environment in which examples may be practiced.
Figure 2B:
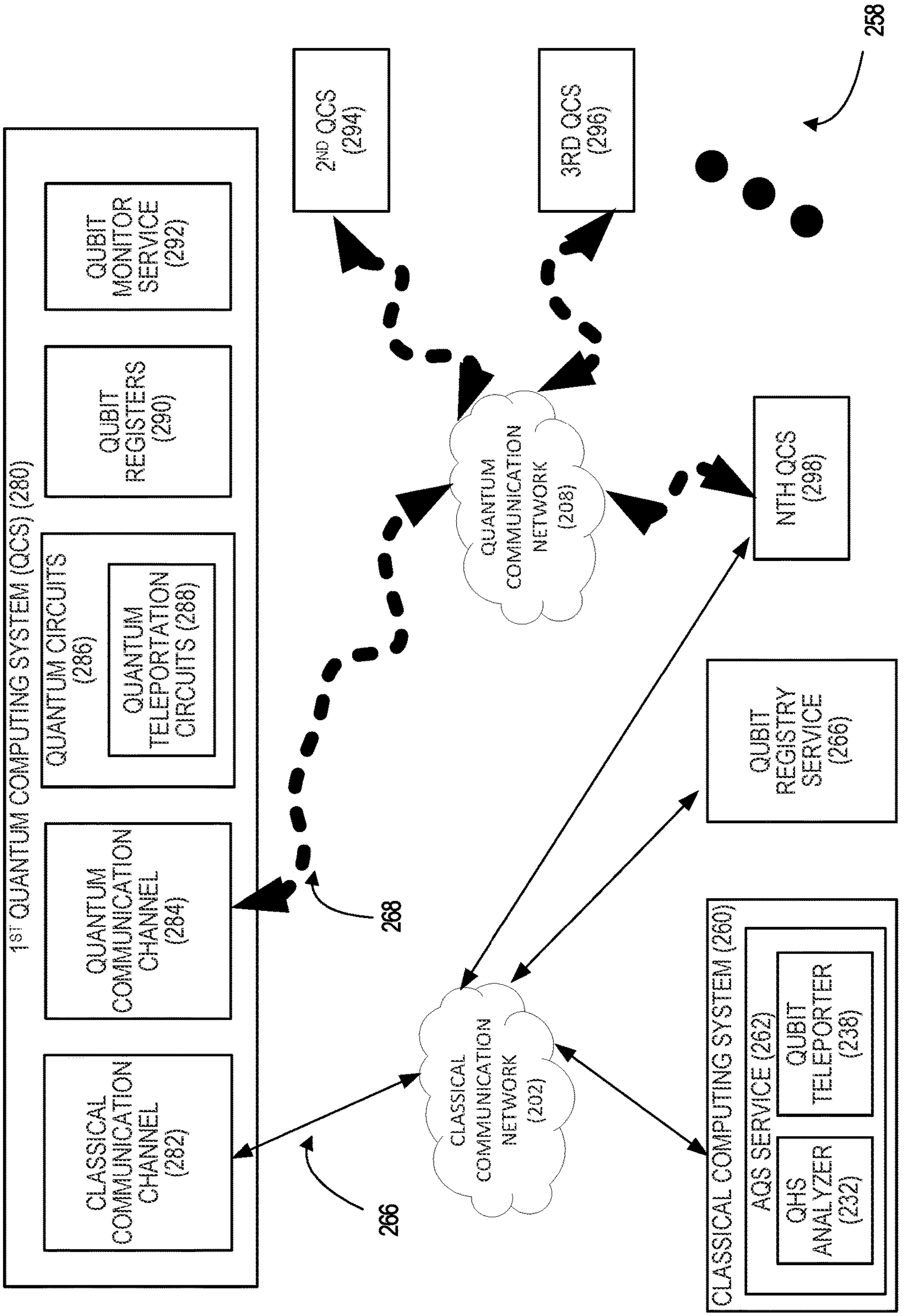
FIG. 2B is a block diagram of a distributed computing environment in which examples may be practiced.

In some embodiments, swapping out a qubit may include swapping the quantum states of the first and second qubits. That is, prior to being "swapped-in" to the computation, the second (non-anomalous) qubit may be prepared in a quantum state that is equivalent to (or at least similar to) the quantum state of the first (anomalous) qubit. The no-cloning theorem of quantum mechanics dictates that a qubit "copy" operation is not possible in quantum computations. However, such swapping of the quantum states may be performed via qubit swap gates or quantum teleportation protocols. As shown in FIG. 2A, the qubit swapper 136 may initiate the swapping of quantum states between the anomalous and the non-anomalous qubit. As shown in FIG. 2B, the qubit teleporter 138 may initiate the teleportation of the quantum state of the anomalous qubit to the non-anomalous qubit. Also note that the quantum state of the first qubit need not be known to perform such qubit swap or quantum teleportation operations.

In such "quantum-state swapping" embodiments, the quantum process schedular 172 may temporarily suspend of pause the quantum computations. Upon pausing the computations, the qubit swapper 136 may cause the quantum states of the first and second qubits to be swapped, or the qubit teleporter 138 may cause the state of the first qubit is teleported to the second qubit. After the swapping or teleportation of the quantum states, the quantum process schedular 172 may then cause the resumption of the quantum computation. The quantum application updater 176 may cause an update to the quantum instruction set 170, the allocated qubit table 172, and/or the qubit logical to physical address map 174. The updates to the quantum application 116 may indicate that the role of the first qubit has been taken over by the second qubit. The quantum process schedular 172 may resume the quantum computation on the quantum computing sub-system 110. In other embodiments, the quantum process migrator 174 may migrate the quantum computation to another quantum computing system. The second qubit may be a qubit of the quantum computation sub-system 110, the other quantum computing system. In other embodiments, the quantum process schedular 172 may reinitialize an/or re-start the quantum computation, such that the second qubit, rather than the first qubit is employed. The computation may be reinitialized or restarted on the same QCS, or on a separate (or remote) QCS.

In other embodiments, the computation need not be paused to perform the qubit swapping operation. That is, the qubit swapper 132 may cause a "hot-swap" of the qubits. The hot-swap may occur during the execution of the computation. For example, the quantum application updater 176 may cause the update to the quantum application 106 to include the qubit swap or teleportation as part of the logic encoded in the quantum instruction set 170. In still other embodiments, the operation of swapping in the second qubit may include the quantum process schedular 172 to cause a terminating of the computation. In such embodiments, the quantum process schedular 172 may cause a re-initialization and/or a re-starting of the computation from the beginning of the quantum instruction set 170, and on the quantum computing sub-system 110 or another quantum computing system. The re-started computation may employ the second qubit, rather than the first qubit.

FIG. 2A is a block diagram of a computing environment 200 in which examples may be practiced. More particularly, the environment 200 demonstrates example embodiments regarding where a qubit swapper (e.g., qubit swapper 136 of FIG. 1B and/or qubit swapper 236 of FIG. 2A) initiate a swapping of a quantum state of a non-anomalous qubit with the quantum state of an anomalous qubit. Environment 200 includes a quantum computing system 210 and a classical computing system 220. Quantum computing system 210 may be similar to quantum computing sub-system 110 of FIGS. 1A-1B. Classical computing system 220 may be similar to classical computing sub-system 120 of FIGS. 1A-1B. As such, quantum computing system 210 may include qubit registers 214, a quantum process device 212, and a quantum application 216.

In FIGS. 1A-1B, the quantum computing sub-system 110 does not include, but can access, a qubit monitor service (e.g., qubit monitor service 104). In contrast to quantum computing sub-system 110, a qubit monitor service (e.g., qubit monitor service 204 of FIG. 2A) is included in quantum computing system 210. In other embodiments, qubit monitor service 204 may be included in classical computing system 220. Qubit monitor service 204 may be similar to qubit monitor service 104 of FIGS. 1A-1B. As such, each of quantum computing system 210 and classical computing system 220 may access the qubit monitoring services of qubit monitor service 204.

Qubit registers 214 may be similar to qubit registers 114 of FIGS. 1A-1B. Thus, qubit registers 214 may include at least a first set of qubits 252 and a second set of qubits 254. Quantum processor device 212 may be similar to quantum processor device 112 of FIGS. 1A-1B. Quantum processor device 212 may include quantum gates 240. Quantum gates 240 may include one or more quantum swap gates 242. Quantum application 216 may be similar to quantum application 116 of FIGS. 1A-1B. Accordingly, quantum application 216 may include an instruction set 270 and an allocation table 272. The instruction set 270 may be similar to quantum instruction set 170 of FIG. 1B. The allocation table 272 may be similar to allocated qubit table 172 of FIG. 1B.

Being similar to classical computing sub-system 110, classical computing system 220 may include an anomalous qubit swap (AQS) service 230 and a quantum task manager 226. AQS service 230 may be similar to AQS service 130 of FIGS. 1A-1B. Thus, AQS service 230 may include a qubit health signal (QHS) analyzer 232, a qubit swapper 236, and a qubit allocator/deallocator 234. QHS analyzer 232 may be similar to QHS analyzer 132 of FIG. 1B. Qubit swapper 236 may be similar to qubit swapper 136 of FIG. 1B. Qubit allocator/deallocator 234 may be similar to qubit allocator/deallocator 134 of FIG. 1B. Quantum task manager 226 may be similar to quantum task manager 126 of FIGS. 1A-1B.

In FIGS. 1A-1B, the classical computing sub-system 120 does not include, but can access, a qubit registry service (e.g., qubit registry service 106). In contrast to classical computing sub-system 120, a qubit registry service (e.g., qubit registry service 206) is included in classical computing system 220. In other embodiments, qubit registry service 206 may be included in quantum computing system 210. Qubit registry service 206 may be similar to qubit registry service 106 of FIGS. 1A-1B. As such, each of quantum computing system 210 and classical computing system 220 may access the qubit registering services of qubit register service 206.

In the embodiment shown in FIG. 2A, the AQS service 220 has determined that the first set of qubits 252 is anomalous. The second set of qubits is non-anomalous. In response, the qubit swapper 236 has initiated a qubit swap operation, via the quantum swap gates 242. After the qubit swap operation, the quantum states of the two sets of qubits are swapped. More particularly, the qubits of the non-anomalous second set of qubits 254 are in the quantum states of the qubits of the anomalous first set of qubits 252. Likewise, the qubits of the anomalous first set of qubits 252 are in the quantum states of the qubits of the non-anomalous second set of qubits 254.

FIG. 2B is a block diagram of a distributed computing environment 258 in which examples may be practiced. In contrast to the qubit swap operation of environment 200 of FIG. 2A, in FIG. 2B, the non-anomalous qubits may be swapped into a quantum computation, and the anomalous qubits may be swapped out of a quantum computation via quantum teleportation, as initiated by a qubit teleporter (e.g., qubit teleporter 136 of FIG. 1B and/or qubit teleporter 238 of FIG. 2B). More particularly, environment 258 includes a classical computing system 260 and multiple quantum computing systems, which may be distributed quantum computing systems that are remote from one another. The distributed quantum computing systems may include n systems, where n is any positive integer. Environment 258 also includes a qubit registry service 266, which may be similar to qubit registry service 106 of FIGS. 1A-1B and/or qubit registry service 206 of FIG. 2A In the embodiments shown in FIG. 2B, the environment 258 includes a first quantum computing system (QCS) 280, a second QCS 294, a third QCS 296, . . . , and an nth QCS 298. The classical computing system 260 and each of quantum computing systems may be communicatively coupled via a classical communication network 202. Classical communication network 202 may be similar to communication network 102 of FIG. 1A. Each of the n quantum computing systems may be communicatively coupled to one another via a quantum communication network 208. Quantum communication network 208 provides one or more quantum channels (e.g., quantum channel 268) that couple the quantum computing systems. A quantum channel may allow the exchange of entangled qubits to enable the quantum teleportation to exchange quantum states between anomalous and non-anomalous qubits.

Each of the quantum computing systems of environment 258 may be similar to quantum computing sub-system 110 of FIGS. 1A-1B and/or quantum computing system 210 of FIG. 2A. For clarity purposes, only the details of the first QCS 280 are shown in FIG. 2B. However, the other quantum computing systems in FIG. 2B may include similar elements and/or components of first QCS 280 of FIG. 2B. First QCS 280 may include a classical communication channel 282, a quantum communication channel 284, quantum circuits 286, qubit registers 290, and a qubit monitor service 292. Classical communication channel 282 may be similar to classical interface 11 of FIG. 1A. Quantum communication channel 284 may be a communication channel that enables the first QCS 280 to entangle and/or exchange qubits of the qubit registers 290 with qubits of the other quantum computing systems of FIG. 2B. Quantum circuits 286 may include quantum teleportation circuits 288. The combination of the classical communication network 202, the quantum communication network 208, and the teleportation circuits 288 enable the quantum teleportation of quantum states of anomalous qubits to the non-anomalous qubits. Similar to the qubit registers 114 of FIGS. 1A-1B and/or qubit registers 214 of FIG. 2A, the qubit registers 290 may include one or more sets of qubits. Qubit monitor service 292 may be similar to qubit monitor service 104 of FIGS. 1A-1B and/or qubit monitor service 204 of FIG. 2A.

Being similar to classical computing sub-system 110, classical computing system 260 may include an anomalous qubit swap (AQS) service 262. AQS service 262 may be similar to AQS service 130 of FIGS. 1A-1B and/or AQS service 230 of FIG. 2A. As such, AQS service 262 may include a qubit health signal (QHS) analyzer 232 and a qubit teleporter 238. AQS analyzer 232 may be similar to QHS analyzer 232 of FIG. 1B and/or QHS analyzer 232 of FIG. 2A. Qubit teleporter 238 may be similar to qubit teleporter 138 of FIG. 1B. As such, qubit teleporter 238 may cause and/or initiate the teleportation of quantum states of anomalous qubits to the non-anomalous qubits.

Figure 3:
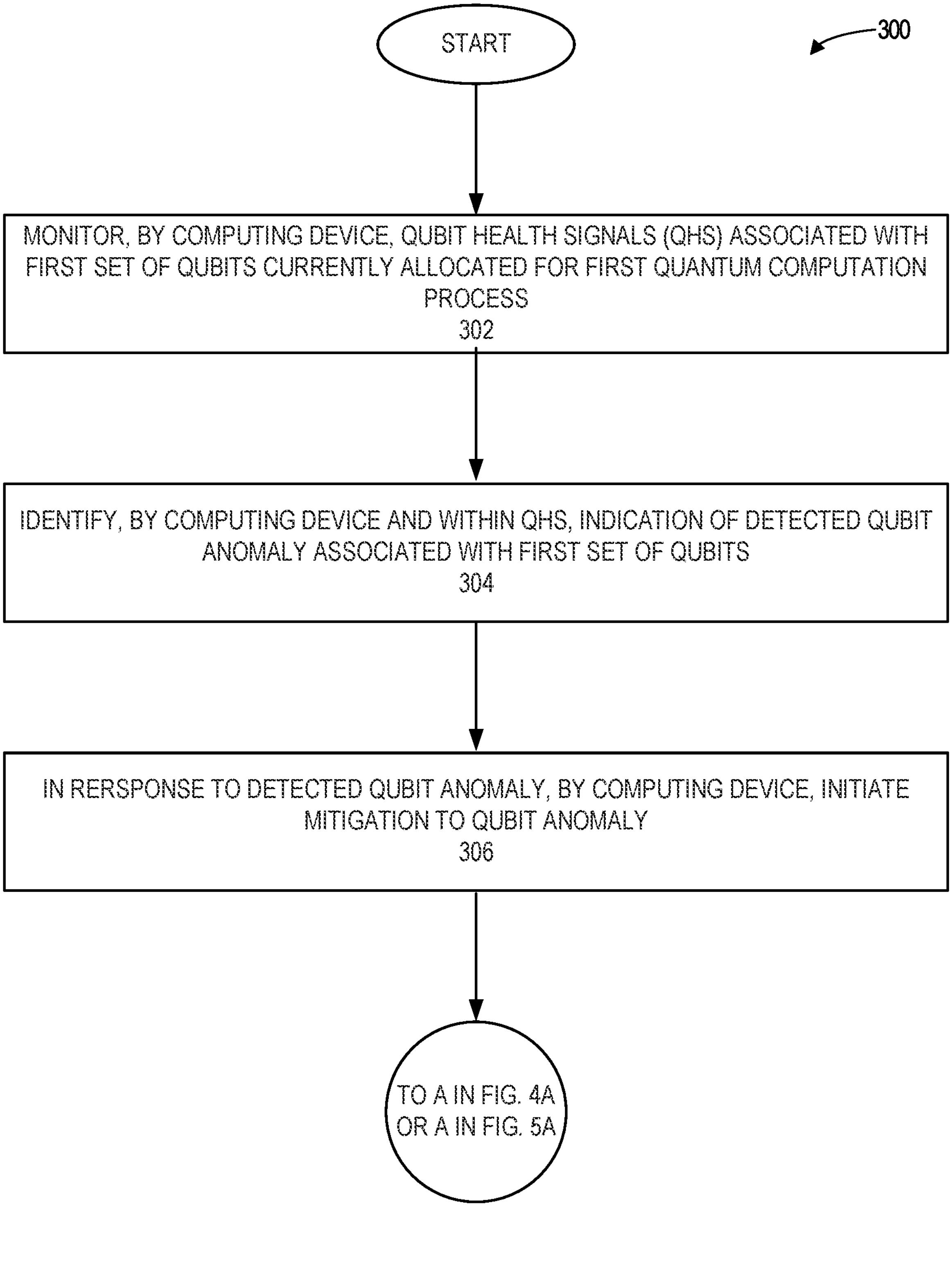
FIGS. 3-5B are flowcharts illustrating operations performed by the computing systems of FIGS. 1A-2B for mitigation services of qubit decoherence in the systems.

FIGS. 3A-5B are flowcharts illustrating operations performed by the computing systems of FIGS. 1A-2B for mitigation services of qubit decoherence in the systems. The flowchart of FIG. 3 shows a method 300 for mitigating issues associated with qubit anomalies. Method 300 begins at block 302, where qubit health signals (QHSs) are monitored by a computing device. The QHSs may be associated with a first set of qubits that are currently allocated for a first quantum computation process (QCP). At block 304, the computing device may identify (within the monitored QHSs) an indication of a detected qubit anomaly. The anomalous qubit may be included in the first set of qubits. At block 306, and in response to the detected qubit anomaly, the computing device may initiate a mitigation to the qubit anomaly. In at least one embodiment, initiating the mitigation to the qubit anomaly may include proceeding to method 400 of FIG. 4A. In other embodiments, initiating the mitigation to the qubit anomaly may include proceeding to method 500 of FIG. 5A.

Figure 4A:
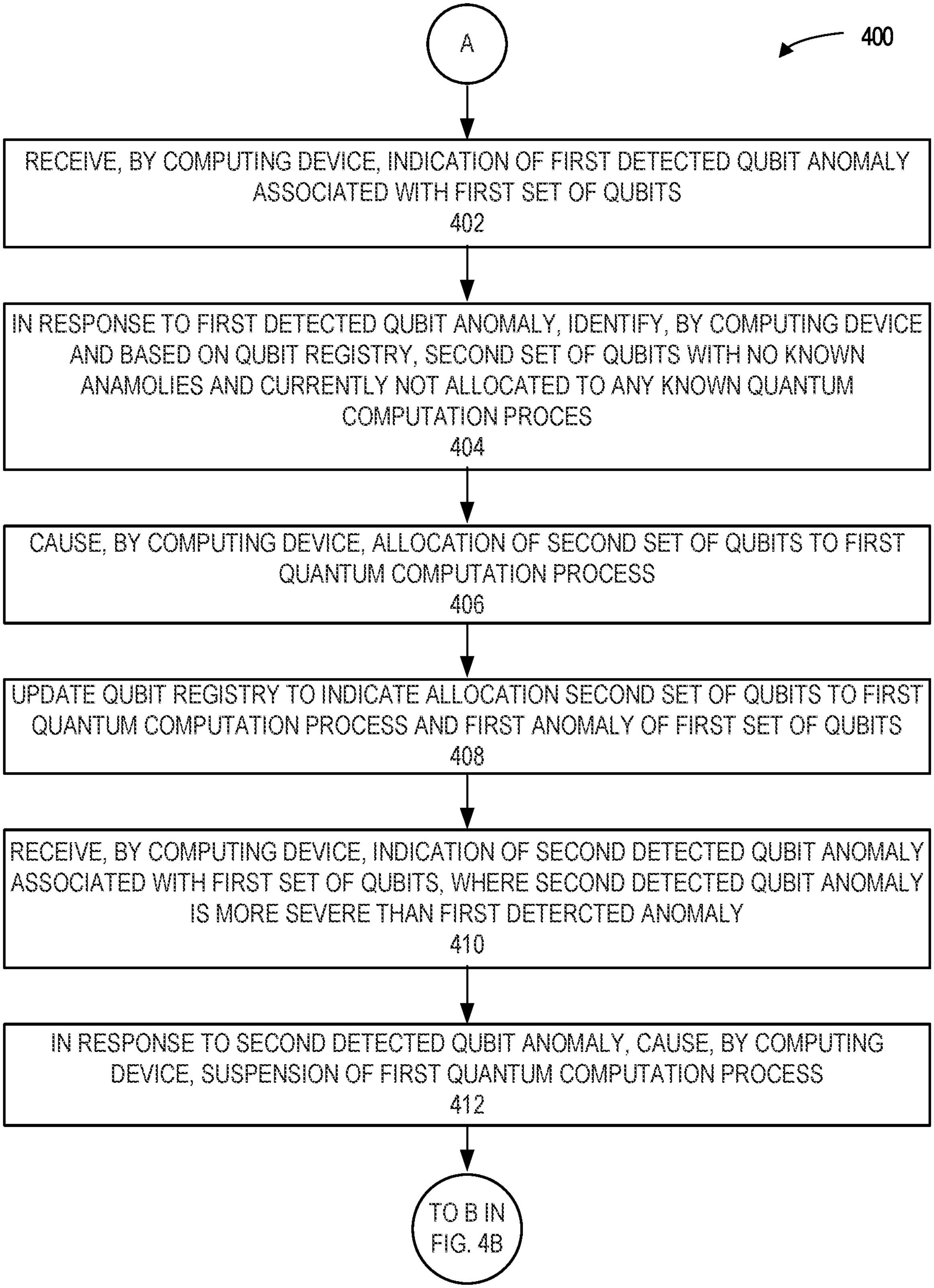

The flowchart of FIG. 4A shows a method 400 for swapping anomalous qubits in a quantum computation process (QCP). Method 400 may be a continuation of method 300 of FIG. 3. Method 400 may be initiated after implementation of block 306 of method 300. Method 400 begins at block 402, where the computing device receives an indication of a first detected qubit anomaly associated with the first set of qubits. At block 404, and in response to the first detected qubit anomaly, the computing device may identify a second set of qubits with no known anomalies. Furthermore, the second set of qubits may not be currently allocated to any known quantum computing processes. At block 406, the computing device may cause an allocation of the second set of qubits to the first QCP. At block 408, a qubit registry may be updated to indicate the allocation of the second set of qubits to the first QCP. The update to the qubit registry may further indicated the first anomaly of the first set of qubits.

At block 410, the computing device may receive a second indication. The second indication may indicate a second qubit anomaly associated with the first set of qubits. The second detected anomaly may be more severe than the first detected anomaly. At block 412, and in response to the second detected qubit anomaly associated with the first set of qubits, the computing device may cause a suspension of the first QCP. After implementing block 412, method 400 may flow to method 420 of FIG. 4B.

Figure 4B:
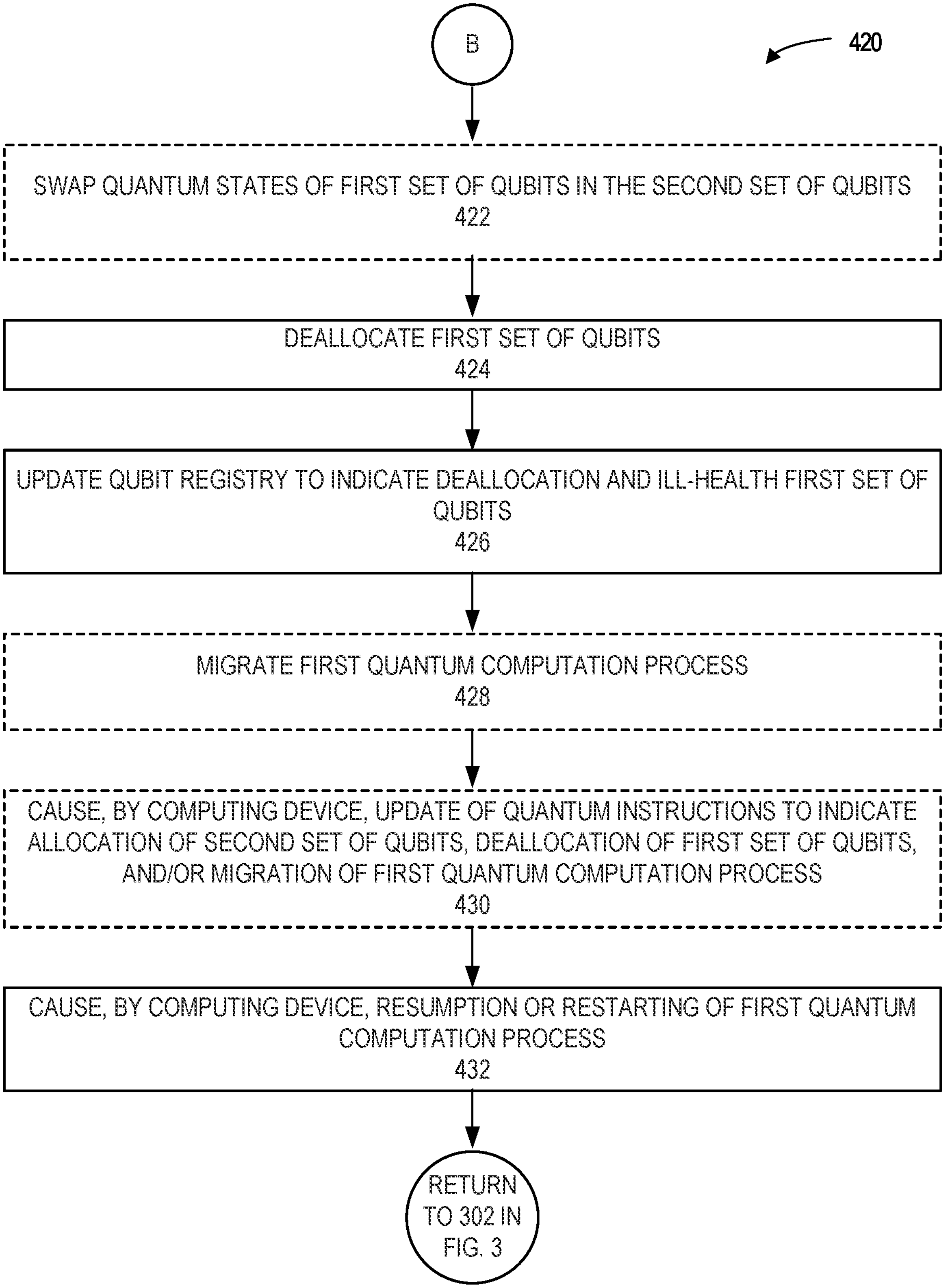

The flowchart of FIG. 4B shows a method 420 for swapping anomalous qubits in a quantum computation process (QCP). Method 420 may be a continuation of method 400 of FIG. 4A. Method 420 may be initiated after implementation of block 412 of method 400. Method 420 begins at block 422. Block 422 may be an optional block, where the quantum states of the first set of qubits are swapped into the quantum states of the second set of qubits. At block 424, the first set of qubits may be deallocated. At block 424, the qubit registry may be updated to indicate the deallocation and ill-health of the first set of qubits. At optional block 428, the first QCP may be migrated to another quantum computing system. At block 420, the computing device may cause an update of a quantum instruction set to indicate the allocation of the second set of qubits, the deallocation of the first set of qubits, and/or the migration of the first QCP to the second quantum computing system. At block 432, the computing device may cause a resumption and/or a restarting of the first QCP.

Figure 5A:
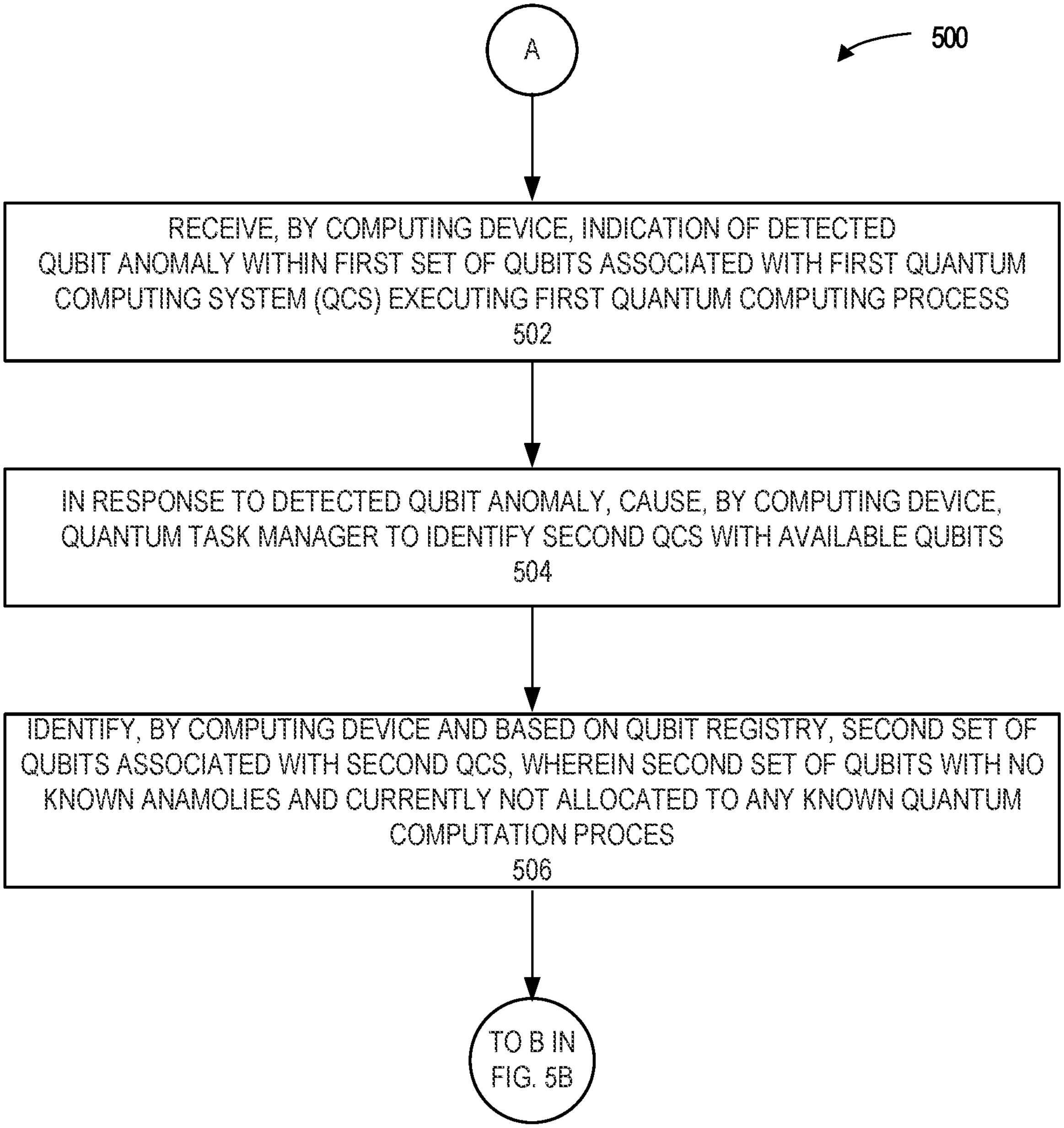

The flowchart of FIG. 5A shows another method 500 for swapping anomalous qubits in a quantum computation process (QCP). Method 500 may be a continuation of method 300 of FIG. 3. Method 500 may be initiated after implementation of block 306 of method 300. Method 500 begins at block 502, where the computing device receive an indication of a detected qubit anomaly with the first set of qubits. The first set of qubits may be allocated to and/or associated with the first quantum computation process (QCP). The first QCP may be executed on and/or implemented by a first quantum computing system (QCS). At block 504, and in response to the detected qubit anomaly, the computing device may cause a quantum task manager to identify a second QCS with currently available (and non-anomalous) qubits. At block 506, the computing device may cause an identification of a second set of qubit associated with the second QCS. Identifying the second set of qubits may be based on and/or implemented by a qubit registry. The second set of qubits may have no known (or be associated with) qubit anomalies. Furthermore, the second set of qubits may not be currently allocated with any known quantum computation process. After implementing block 506, method 500 may flow to method 520 of FIG. 5B.

Figure 5B:
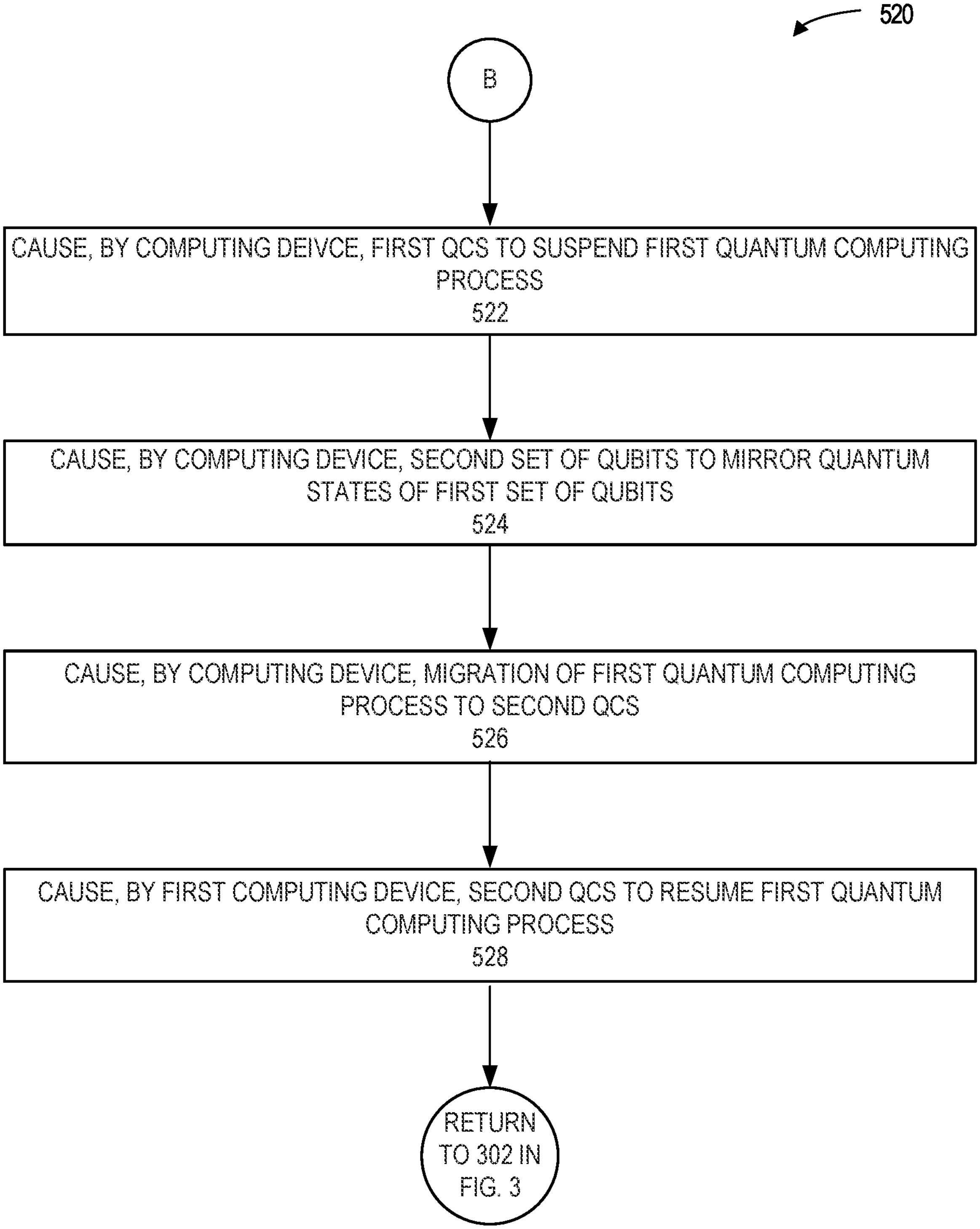

The flowchart of FIG. 5B shows a method 520 for swapping anomalous qubits in a quantum computation process (QCP). Method 520 may be a continuation of method 500 of FIG. 5A. Method 520 may be initiated after implementation of block 506 of method 500. Method 520 begins at block 522, where the computing device causes the first QCS to suspend the first QCP. At block 524, the computing device may cause the second set of qubits to mirror the quantum states of the first set of qubits. At block 526, the computing device may cause a migration of the first QCP from the first QCS to the second QCS. At block 528, the first computing device may cause the second QCS to resume the first QCP.

Figure 6:
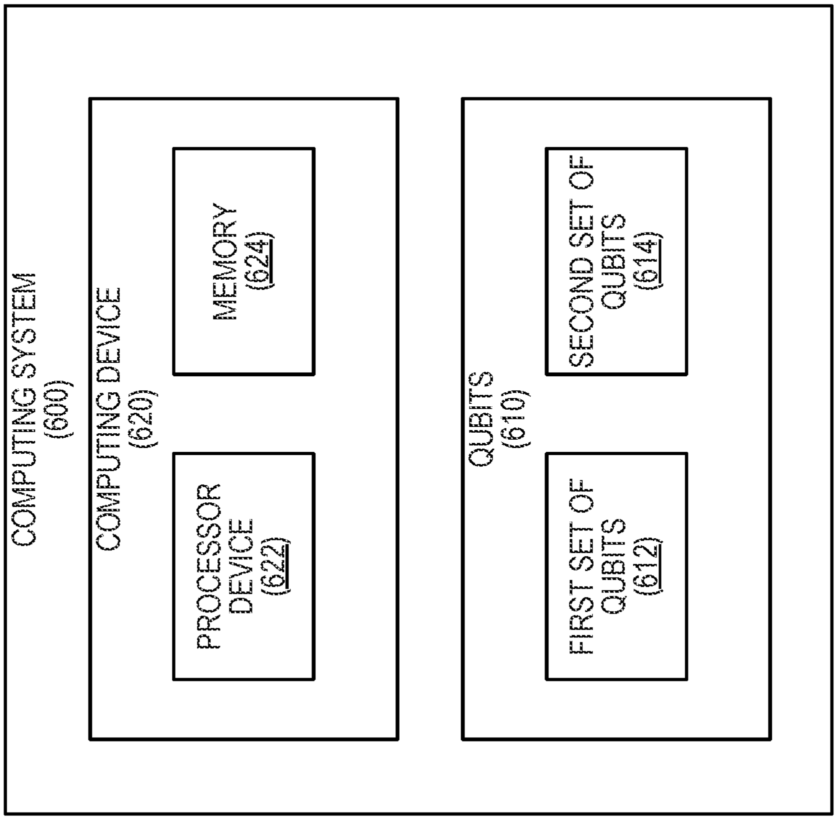
FIG. 6 is a block diagram of a computing system suitable for implementing examples.

FIG. 6 is a block diagram of a computing system 600 suitable for implementing examples. Computing system 600 may be a classical computing system, a quantum computing system, and/or a combination thereof. Computing system 600 includes a computing device 620 and qubits 610. Computing device 620 may be a classical computing device, a quantum computing device, or a combination of classical and quantum components that comprise a classical computing device and/or a quantum computing device. As such, computing device 620 includes a processor device 622 and a memory 624. Processor device 622 may be a quantum processor device, and thus may be similar to quantum processor device 112 of FIG. 1A, quantum processor device 212 of FIG. 2A, and/or processor device 726 of FIG. 7. In other embodiments, processor device 622 may be a classical processor device, and be similar to classical processor device 122 of FIG. 1A. Computing device 620 may be similar to quantum computing sub-system 110 of FIG. 1A, classical computing sub-system 120 of FIG. 1A, and/or quantum computing device 700 of FIG. 7. Qubits 610 may include a first set of qubits 612 and a second set of qubits.

In various embodiments, the processor device 622 is communicatively coupled to the memory 624. The combination of the processor device 622 and the memory 624 configure the computing system to receive an indication of a detected anomaly associated with the first set of qubits 612. The first set of qubits 612 may be currently allocated for a quantum computation process implemented by computing system 600 or any other quantum computing system or sub-system discussed herein. In response to receiving the indication, the computing system 600 may cause an allocation of the second set of qubits 614 for the quantum computation process.

Figure 7:
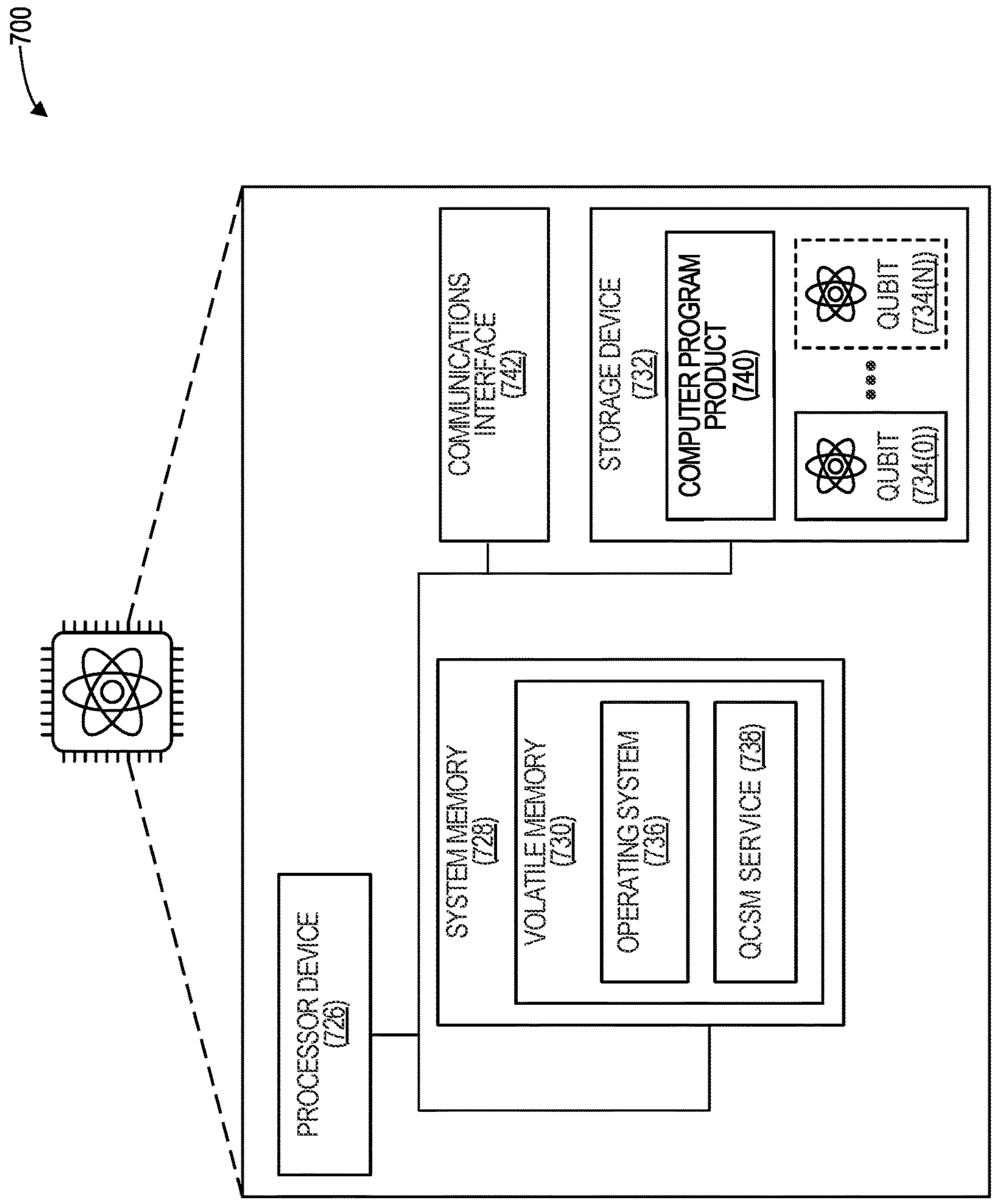
FIG. 7 is a block diagram of a quantum computing device suitable for implementing examples.

FIG. 7 is a block diagram of a quantum computing device 700 suitable for implementing examples. Quantum computing device 700 may be similar to quantum computing sub-system 110 of FIG. 1A, quantum computing system 210 of FIG. 2A, and/or any of the quantum computing systems of FIG. 2B (e.g., first QCS 280, $2^{nd}$ computing system 294, or third QCS 296). The quantum computing device 700 may comprise any suitable quantum computing device or devices. The quantum computing device 700 can operate using classical computing principles or quantum computing principles. When using quantum computing principles, the quantum computing device 700 performs computations that utilize quantum-mechanical phenomena, such as superposition and entanglement. The quantum computing device 700 may operate under certain environmental conditions, such as at or near zero degrees (0°) Kelvin. When using classical computing principles, the quantum computing device 700 utilizes binary digits that have a value of either zero (0) or one (1).

The quantum computing device 700 includes a processor device 726 and a system memory 728. The processor device 726 can be any commercially available or proprietary processor suitable for operating in a quantum environment. The system memory 728 may include volatile memory 730 (e.g., random-access memory (RAM)). The quantum computing device 700 may further include or be coupled to a non-transitory computer-readable medium such as a storage device 732. The storage device 732 and other drives associated with computer-readable media and computer-usable media may provide non-volatile storage of data, data structures, computer-executable instructions, and the like. The storage device may also provide functionality for storing one or more qubits 734(0)-734(N).

A number of modules can be stored in the storage device 732 and in the volatile memory 730, including an operating system 736 and one or more modules, such as a QCSM service 738. All or a portion of the examples may be implemented as a computer program product 640 stored on a transitory or non-transitory computer-usable or computer-readable medium, such as the storage device 732, which includes complex programming instructions, such as complex computer-readable program code, to cause the processor device 726 to carry out the steps described herein. Thus, the computer-readable program code can comprise computer-executable instructions for implementing the functionality of the examples described herein when executed on the processor device 726.

An operator may also be able to enter one or more configuration commands through a keyboard (not illustrated), a pointing device such as a mouse (not illustrated), or a touch-sensitive surface such as a display device (not illustrated). The quantum computing device 700 may also include a communications interface 742 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:

receiving, by a computing device, a first indication of a first detected anomaly associated with a first set of qubits, wherein the first set of qubits is currently allocated for a quantum computation process, and wherein the first indication encodes a first value corresponding to at least one qubit of the first set of qubits, and the first value is greater than a first value threshold;

in response to receiving the indication, causing, by the computing device, an allocation of a second set of qubits for the quantum computation process;

receiving, by the computing device, a second indication of a detected second anomaly associated with the first set of qubits, wherein the second indication is received subsequent to the first indication and the second anomaly is a more severe anomaly than the first anomaly, wherein the second indication encodes a second value corresponding to the at least one qubit of the first set of qubits, the second value is greater than the first value, and the second value threshold is greater than the first value threshold; and in response to receiving the second indication, causing, by the computing device, a preparation of quantum states of the second set of qubits to be equivalent to quantum states of the first set of qubits.

2. The method of claim 1, further comprising:

receiving, by the computing device, the first indication of the first detected anomaly associated with the first set of qubits, wherein the first indication encodes that the first detected anomaly is associated with a detection of an elevated temperature corresponding to at least one qubit of the first set of qubits.

3. The method of claim 1, further comprising:

receiving, by the computing device, the first indication of the first detected anomaly associated with the first set of qubits, wherein the first indication encodes that the first detected anomaly is associated with a detected error or a detected error rate corresponding to at least one qubit of the first set of qubits.

4. The method of claim 1, further comprising updating the quantum computation process to replace a utilization of the first set of qubits with a utilization of the second set of qubits; and causing, by the computing device, a deallocation of the first set of qubits for the quantum computation process.

5. The method of claim 1, wherein the preparation of the quantum states of the second set of qubits includes:

performing, by a quantum swap gate, a qubit swap operation between the first set of qubits and the second set of qubits.

6. The method of claim 1, wherein the first set of qubits is associated with a first quantum computing system (QCS) and the second set of qubits is associated with a second QCS that is remote from the first QCS.

7. The method of claim 6, further comprising:

selecting the second QCS from a set of QCSs based on a qubit monitor service that monitors a current utilization of each QCS in the set of QCS.

8. The method of claim 6, wherein the preparation of the quantum states of the second set of qubits includes:

performing, by a classical communication channel, a quantum communication channel, and a set of quantum gates, a quantum teleportation of the quantum states of the first set of qubits to the second set of qubits.

9. The method of claim 6, wherein the first QCS implements an execution of the quantum computation process, and the method further comprises:

causing, by the computing device, a migration of the execution of the quantum computation process, from the first QCS to the second QCS.

10. The method of claim 9, wherein the migration of the execution of the quantum process includes:

causing, by the computing device, the first QCS to suspend the execution of the quantum computing process at a particular step of the execution;

updating the quantum computation process to replace a utilization of the first set of qubits with a utilization of the second set of qubits; and causing, by the computing device, the second QCS to resume the execution of the quantum computing process at the particular step of the execution, such that when resumed, the updated quantum computing process is implemented by the second QCS and utilizes the second set of qubits.

11. The method of claim 9, wherein the migration of the execution of the quantum process includes:

causing, by the computing device, the first QCS to terminate the execution of the quantum computing process; and causing, by the computing device, the second QCS to initiate a second execution of the quantum computing process from an initial step of the quantum computing process, such that when initiated, the second execution of the quantum computing process utilizes the second set of qubits.

12. The method of claim 1, further comprising:

causing, by the computing device, a qubit registry to indicate the allocation of the second set of qubits for the quantum computing process.

13. The method of claim 1, further comprising:

causing, by the computing device, a deallocation of the first set of qubits for the quantum computation process;

causing, by the computing device, a qubit registry to indicate the deallocation of the first set of qubits for the quantum computing process; and causing, by the computing device, the qubit registry to indicate the detected anomaly associated with the first set of qubits.

14. The method of claim 1, further comprising:

selecting the second set of qubits from a superset of qubits based on a state of a qubit registry that indicates a current allocation status for each qubit of the superset of qubits.

15. A computing system, comprising a computing device comprising:

a memory; and a processor device coupled to the memory to:

receive a first indication of a first detected anomaly associated with a first set of qubits, wherein the first set of qubits is currently allocated for a quantum computation process, and wherein the first indication encodes a first value corresponding to at least one qubit of the first set of qubits, and the first value is greater than a first value threshold;

in response to receiving the indication, cause an allocation of a second set of qubits for the quantum computation process;

receiving, by the computing device, a second indication of a detected second anomaly associated with the first set of qubits, wherein the second indication is received subsequent to the first indication and the second anomaly is a more severe anomaly than the first anomaly, wherein the second indication encodes a second value corresponding to the at least one qubit of the first set of qubits, the second value is greater than the first value, and the second value threshold is greater than the first value threshold; and in response to receiving the second indication, causing, by the computing device, a preparation of quantum states of the second set of qubits to be equivalent to quantum states of the first set of qubits.

16. A non-transitory computer-readable storage medium that includes executable instructions to cause a processor device to:

receive a first indication of a first detected anomaly associated with a first set of qubits, wherein the first set of qubits is currently allocated for a quantum computation process, and wherein the first indication encodes a first value corresponding to at least one qubit of the first set of qubits, and the first value is greater than a first value threshold;

in response to receiving the indication, cause an allocation of a second set of qubits for the quantum computation process;

receiving, by the computing device, a second indication of a detected second anomaly associated with the first set of qubits, wherein the second indication is received subsequent to the first indication and the second anomaly is a more severe anomaly than the first anomaly, wherein the second indication encodes a second value corresponding to the at least one qubit of the first set of qubits, the second value is greater than the first value, and the second value threshold is greater than the first value threshold; and in response to receiving the second indication, causing, by the computing device, a preparation of quantum states of the second set of qubits to be equivalent to quantum states of the first set of qubits.

* * * * *